(12) United States Patent
Toma et al.

(10) Patent No.: US 12,192,561 B2
(45) Date of Patent: *Jan. 7, 2025

(54) TRANSMITTING METHOD, RECEIVING METHOD, TRANSMITTING APPARATUS, AND RECEIVING APPARATUS

(71) Applicant: Panasonic Intellectual Property Corporation of America, Torrance, CA (US)

(72) Inventors: Tadamasa Toma, Osaka (JP); Noritaka Iguchi, Osaka (JP); Takahiro Nishi, Nara (JP); Hisaya Katou, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/228,051

(22) Filed: Jul. 31, 2023

(65) Prior Publication Data

US 2023/0379519 A1 Nov. 23, 2023

Related U.S. Application Data

(63) Continuation of application No. 17/357,208, filed on Jun. 24, 2021, now Pat. No. 11,765,414, which is a (Continued)

(30) Foreign Application Priority Data

Aug. 8, 2014 (JP) .................................. 2014-163150

(51) Int. Cl.
*H04N 21/43* (2011.01)
*H04H 20/18* (2008.01)
(Continued)

(52) U.S. Cl.
CPC ...... *H04N 21/43072* (2020.08); *H04H 20/93* (2013.01); *H04H 60/13* (2013.01);
(Continued)

(58) Field of Classification Search
CPC ............. H04N 21/242; H04N 21/4302; H04N 21/43072; H04N 21/4622; H04N 21/6112;
(Continued)

(56) References Cited

U.S. PATENT DOCUMENTS 8,424,037 B2 4/2013 Landow
8,578,272 B2 11/2013 Pantos
(Continued)

FOREIGN PATENT DOCUMENTS

EP 3 026 920 6/2016
JP 2002-373130 12/2002
(Continued)

OTHER PUBLICATIONS

International Search Report of PCT application No. PCT/JP2014/004325 dated Nov. 25, 2014.
(Continued)

*Primary Examiner* — Fernando Alcon
(74) *Attorney, Agent, or Firm* — Wenderoth, Lind & Ponack, L.L.P.

(57) ABSTRACT

A transmitting method for transmitting contents using a broadcast wave and a communication path comprises: including content information in application control information when transmitting the contents using both the broadcast wave and the communication path, the content information being information for synchronizing a content transmitted by using the broadcast wave with a content transmitted by using the communication path at a reception side that receives the contents and being related to the
(Continued)

content transmitted by using the communication path; and transmitting the application control information by using at least the broadcast wave in the broadcast wave and the communication path. As a result, a contents transmitting method is provided for enabling a quick access to contents through communication when the contents are reproduced by a combination of broadcast and communication on the receiving side.

2 Claims, 23 Drawing Sheets

Related U.S. Application Data continuation of application No. 15/045,373, filed on Feb. 17, 2016, now Pat. No. 11,082,733, which is a continuation of application No. PCT/JP2014/004325, filed on Aug. 22, 2014.

(60) Provisional application No. 61/874,578, filed on Sep. 6, 2013, provisional application No. 61/871,380, filed on Aug. 29, 2013.

(51) Int. Cl.

| | |
|---|---|
| *H04H 20/24* | (2008.01) |
| *H04H 20/93* | (2008.01) |
| *H04H 60/13* | (2008.01) |
| *H04N 21/242* | (2011.01) |
| *H04N 21/462* | (2011.01) |
| *H04N 21/61* | (2011.01) |
| *H04N 21/8547* | (2011.01) |

(52) U.S. Cl.
CPC ....... *H04N 21/242* (2013.01); *H04N 21/4302* (2013.01); *H04N 21/4622* (2013.01); *H04N 21/6112* (2013.01); *H04N 21/6125* (2013.01); *H04N 21/8547* (2013.01); *H04H 20/18* (2013.01); *H04H 20/24* (2013.01)

(58) Field of Classification Search
CPC ........... H04N 21/6125; H04N 21/8547; H04N 21/4307; H04H 20/93; H04H 60/13; H04H 20/18; H04H 20/24
See application file for complete search history.

(56) References Cited

U.S. PATENT DOCUMENTS

| | | | |
|---|---|---|---|
| 11,272,257 B2 * | 3/2022 | Luo | ....................... H04N 21/233 |
| 2003/0032419 A1 | 2/2003 | Shibasaki et al. | |
| 2005/0155057 A1 | 7/2005 | Wei | |
| 2007/0266415 A1 | 11/2007 | Yu | |
| 2008/0030780 A1 | 2/2008 | Izawa | |
| 2011/0093895 A1 | 4/2011 | Lee | |
| 2012/0019732 A1 | 1/2012 | Lee | |
| 2012/0054235 A1 | 3/2012 | Kitazato et al. | |
| 2012/0072965 A1 | 3/2012 | Dewa | |
| 2012/0099656 A1 | 4/2012 | Ohya et al. | |
| 2012/0163268 A1 | 6/2012 | Kim | |
| 2012/0230389 A1 | 9/2012 | Laurent | |
| 2013/0016282 A1 | 1/2013 | Kim | |
| 2013/0198642 A1 * | 8/2013 | Carney | .............. H04N 21/6587 |
| | | | 715/738 |
| 2013/0293677 A1 | 11/2013 | Lee et al. | |
| 2013/0335629 A1 | 12/2013 | Laurent | |
| 2014/0075472 A1 | 3/2014 | Mitsuya | |
| 2014/0147088 A1 | 5/2014 | Kawaguchi et al. | |
| 2014/0250479 A1 | 9/2014 | Lee | |
| 2014/0344846 A1 | 11/2014 | Yamamura et al. | |
| 2014/0344883 A1 | 11/2014 | Kitazato | |
| 2014/0344884 A1 | 11/2014 | Kitahara | |
| 2015/0052224 A1 | 2/2015 | Kitahara | |
| 2016/0037199 A1 | 2/2016 | Oh | |
| 2019/0281100 A1 * | 9/2019 | Lo | .......................... H04L 65/612 |
| 2020/0267422 A1 * | 8/2020 | Van Brandenburg | ........................ H04N 21/64322 |
| 2022/0014817 A1 * | 1/2022 | Zubalsky | ............... H04N 21/44 |

FOREIGN PATENT DOCUMENTS

| | | |
|---|---|---|
| JP | 2003- 50589 | 2/2003 |
| JP | 2005-136762 | 5/2005 |
| JP | 2009-118354 | 5/2009 |
| JP | 2012-95053 | 5/2012 |
| JP | 2013-138332 | 7/2013 |
| WO | 2006/022271 | 3/2006 |
| WO | 2012/029566 | 3/2012 |
| WO | 2012/039316 | 3/2012 |
| WO | 2012/099359 | 7/2012 |
| WO | 2012/161125 | 11/2012 |
| WO | 2012/161129 | 11/2012 |
| WO | 2013/011696 | 1/2013 |
| WO | 2013/099101 | 7/2013 |

OTHER PUBLICATIONS

"Information technology—High efficiency coding and media delivery in heterogeneous environments—Part1:MPEG media transport (MMT)", ISO/IEC FDIS 23008-1, 2013.
Extended European Search Report issued Jul. 14, 2016 in related European Application No. 14841314.9.
Kyungmo Park: Editors' study of SoDIS (ISO/IEC 23008-1), Information technology—High efficiency coding and media delivery in heterogeneous environments—Part 1: MPEG media transport (MMT), MPEG Meeting; Oct. 28, 2013- Jan. 11, 2813; Geneva; (Motion Picture Expert Group or ISO/IEC JTC1/SC29/WG11), No. m30816, Oct. 26, 2013 (Oct. 26, 2013), XP030059271.
"WD2 of ISO/IEC 13818-1:2013/AMD.6—Delivery of Timeline for External Data", 105. MPEG Meeting; Jul. 29, 2013-Feb. 8, 2013; Vienna; (Motion Picture Expert Group or ISO/IEC JTC1/SC29/WG11), No. N13661, Aug. 2, 2013 (Aug. 2, 2013), XP030020409.
Jean Le Feuvre et al.: "Extensible Syntax and Extensions for TS Timeline", 105. MPEG Meeting; Jul. 29, 2013-Feb. 8, 2013; Vienna; (Motion Picture Expert Group or ISO/IEC JTCI/SC29/WG11), No. m30300, Jul. 24, 2013 (Jul. 24, 2013), XP030058827.
DVB Organization: Kinji-Matsumura-Hybridcast.pdf, Toward the Construction of Hybridcast, DVB, Digital Video Broadcasting, C/O Ebu—17A Ancienne Route—CH-1218 Grand Saconnex, Geneva—SWITZERLAND, Oct. 20, 2011 (Oct. 20, 2011), XP017846886.
Mendes Costa Segundo Ricardo et al.: "Second Screen Event Flow Synchronization", 2013 IEEE International Symposium On Broadband Multimedia Systems and Broadcasting (BMSB), IEEE, Jun. 5, 2013 (Jun. 5, 2013), pp. 1-7, XP032495821.
ANONYMOUS: "Text of ISO/IEC 2nd CD 23008-1 MPEG Media Transport", 103. MPEG Meeting; Jan. 21, 2013-Jan. 25, 2013; Geneva; (Motion Picture Expert Group or ISO/IEC JTCI/SC29/WG11), No. N13293, Feb. 12, 2013 (Feb. 12, 2013), XP030020043.
Aoki, Shuichi et al., "A Study on Hybrid Delivery of Content Realized with MMT", Proceedings of the 75th National Convention of IPSJ, Information Processing Society of Japan, Mar. 6, 2013, pp. 3-25 to 3-26, with English-language translation.
ETSI TS 102 823 v1.1.1 (2005) "Digital Video Broadcasting (DVB); Specification for the carriage of synchronized auxiliary data in DVB transport streams" (Year: 2005).

\* cited by examiner

FIG. 1A

```
MPT(){
table_id
...
ID OF MMT PACKAGE
TRANSMISSION PATH IDENTIFYING DESCRIPTOR number_of_assetsfor(i=0; i<number_of_assets; i++){
  LOCATION INFORMATION FOR EACH ASSET
  INDIVIDUAL DESCRIPTORS
}
}
```

FIG. 1B

```
TRANSMISSION PATH IDENTIFYING DESCRIPTOR (){
ATTRIBUTE INFORMATION
}
```

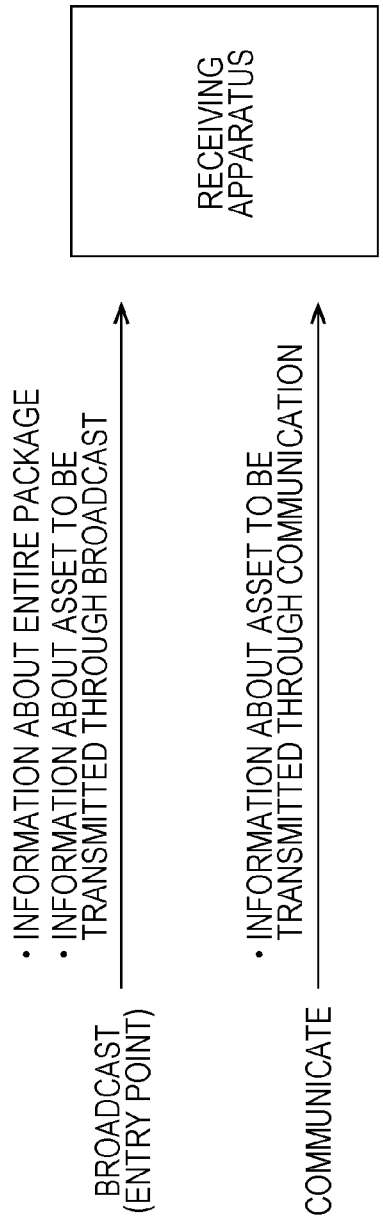

FIG. 3A

```
MPT(){
  table_id = 0
  ...
  for(i=0; i<number_of_assets; i++){
    LOCATION INFORMATION FOR EACH ASSET TO BE TRANSMITTED THROUGH BROADCAST
      INDIVIDUAL DESCRIPTORS
  }
}
```

FIG. 3B

```
MPT(){
  table_id = 1
  ...
  for(i=0; i<number_of_assets; i++){
    LOCATION INFORMATION FOR EACH ASSET TO BE TRANSMITTED THROUGH COMMUNICATION
      INDIVIDUAL DESCRIPTORS
  }
}
```

FIG. 6A

```
PMT(){
  ...
  program_number
  ...
  for (i=0; i<N; i++) {
    TRANSMISSION PATH IDENTIFYING DESCRIPTOR
  }
  for (i=0; i<N1; i++) {
    stream_type
    reserved
    elementary_PID
    reserved
    ES_info_length
    for (i=0; i<N2; i++) {
      descriptor()
    }
    ...
  }
}
```

FIG. 6B

```
TRANSMISSION PATH IDENTIFYING DESCRIPTOR (){
  ATTRIBUTE INFORMATION
  if(IN COMBINATION WITH COMMUNICATION){
    LOCATION INFORMATION ABOUT COMMUNICATION DATA
  }
}
```

FIG. 11A
```
AIT(){
  table_id
  ...
  application_type
  for(i=0;i<N;i++){
    descriptor()
  }
  ...
  application_loop_length
  for(i=0;i<N1;i++){
    application_identifier()
    application_control_code
    ...
    for (i=0;i<N2;i++){
      TRANSMISSION PATH IDENTIFYING DESCRIPTOR
    }
  }
}
```

FIG. 11B
```
TRANSMISSION PATH IDENTIFYING DESCRIPTOR (){
  ATTRIBUTE INFORMATION
  if(IN COMBINATION WITH COMMUNICATION){
    LOCATION INFORMATION ABOUT COMMUNICATION DATA
  }
}
```

FIG. 12
```
ait_identifier_info ( ){
  for(i=0;<N;i++){
    application_type
    transport_type
    ...
    ATTRIBUTE INFORMATION
  }
}
```

FIG. 14

```
LOCATION INFORMATION IDENTIFYING DESCRIPTOR (){
    TRANSMISSION FORMAT: MPD
    LOCATION: LOCATION OF MPD
    INFORMATION ABOUT SYNCHRONIZATION WITH PCR: INFORMATION ABOUT SYNCHRONIZATION BETWEEN PCR AND NTP
}
```

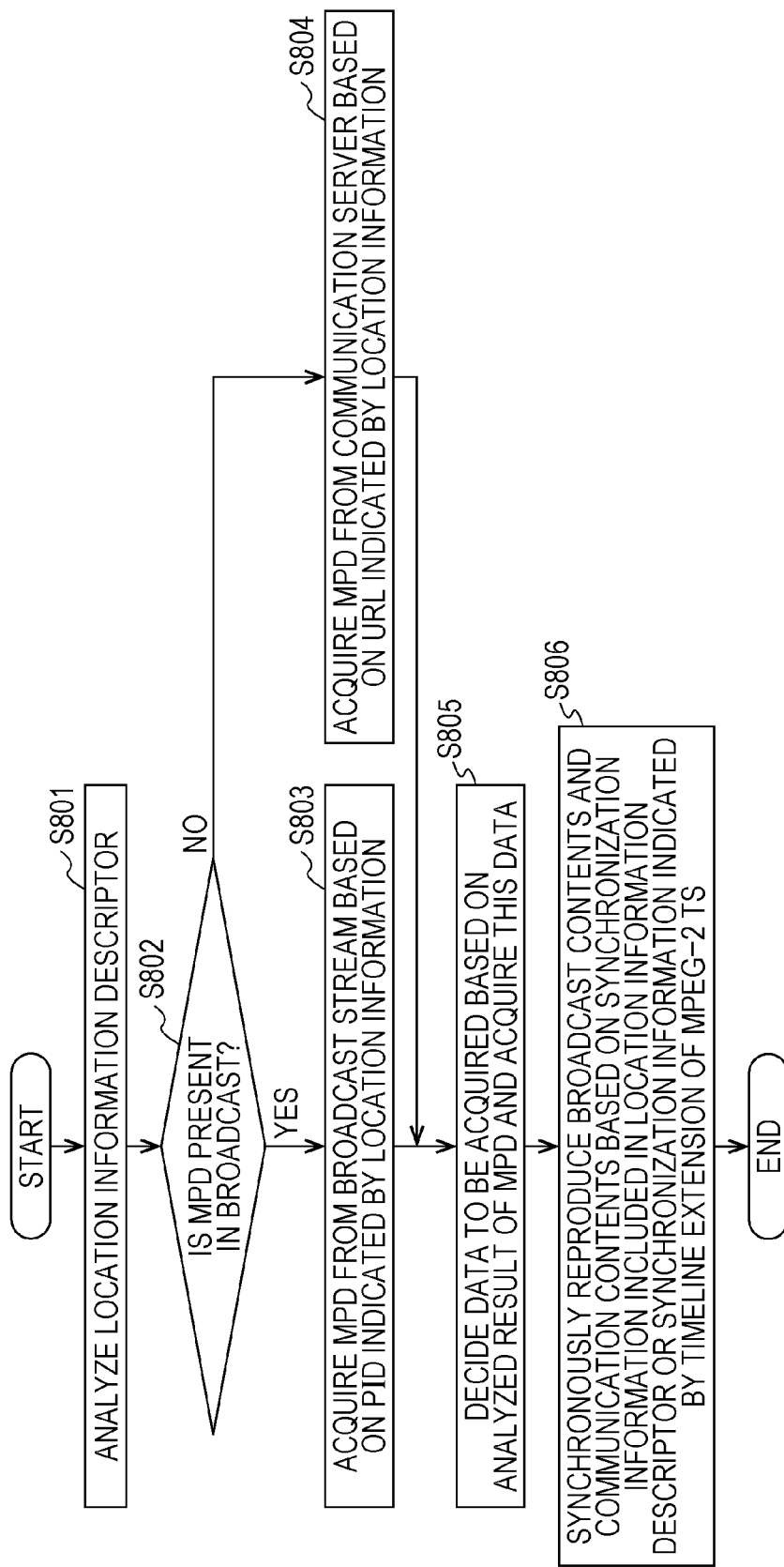

FIG. 16A

```
LOCATION INFORMATION DESCRIPTOR (){
    data_format;
    location_type;
    if (location_type == 0) {
        PID;
    }
    else {
        url_location;
        if (url_location == 0){
            url_length;
            for (i=0; i < url_length; i++) {
                url_path;
            }
        }
    }
}
```

FIG. 16B

```
LOCATION INFORMATION DESCRIPTOR (){
    location_type;
    if (location_type == 0) {
        data_format;
        PID;
    }
    else {
        url_location;
        if (url_location == 0){
            data_format;
            url_length;
            for (i=0; i < url_length; i++) {
                url_path;
            }
        }
    }
}
```

FIG. 16C

```
LOCATION INFORMATION DESCRIPTOR (){
    url_location;
    if (url_location == 0) {
        data_format;
        location_type;
        if (location_typr == 0){
            PID;
        }
        else {
            url_location;
            for (i=0; i < url_length; i++) {
                url_path;
            }
        }
    }
}
```

FIG. 16D

```
LOCATION INFORMATION DESCRIPTOR (){
    data_format;
    location_type;
    if (location_type == 0) {
        PID;
    }
    else if (location_type == 1){
        url_length;
        for (i=0; i < url_length; i++) {
            url_path;
        }
    }
    else if (location_type == 2){
    }
}
```

TRANSMITTING METHOD, RECEIVING METHOD, TRANSMITTING APPARATUS, AND RECEIVING APPARATUS

BACKGROUND

1. Technical Field

The present disclosure relates to a transmitting method, a receiving method, a transmitting apparatus, and a receiving apparatus.

2. Description of the Related Art

Conventionally, a main transmission path for distributing contents is a broadcast wave. A media transport system that is widely used in a broadcast system using the broadcast wave includes, for example, MPEG-2 TS (Moving Picture Experts Group-2 Transport Stream).

On the other hand, contents can be distributed by using a communication path such as an internet with recent advance of network technology. That is to say, the contents can be distributed by using not only a broadcast wave but also a communication path, and thus a transmission path that enables distribution of contents becomes diversified.

For example, Non-Patent Literature 1 discloses MMT (MPEG Media Transport) as a new media transport system which simulates distribution of contents using a combination of broadcast and communication (see Non-Patent Literature 1). For example, Patent Literature 1 discloses a technique mainly of broadcasting for accessing to communication contents based on data acquired from broadcast.

CITATION LIST

Non-Patent Literature

Non-Patent Literature 1: Information technology—High efficiency coding and media delivery in heterogeneous environments—Part1: MPEG media transport (MMT), ISO/IEC FDIS 23008-1

SUMMARY

In one general aspect, the techniques disclosed here feature a transmitting method for transmitting contents using a broadcast wave and a communication path, the transmitting method comprising: including content information in application control information when transmitting the contents using both the broadcast wave and the communication path, the content information being information for synchronizing a content transmitted by using the broadcast wave with a content transmitted by using the communication path at a reception side that receives the contents and being related to the content transmitted by using the communication path, and transmitting the application control information by using at least the broadcast wave in the broadcast wave and the communication path.

The generic or specific aspects may be realized by a data receiving method, an integrated circuit, a computer program, or a recording medium such as a CD-ROM readable by a computer or may be realized by any combination of the data receiving method, the integrated circuit, the computer program, and the recording medium.

The present disclosure can provide a contents transmitting method for enabling a quick access to contents through communication when the contents are reproduced by using the combination of broadcast and communication on the receiving side.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

It should be noted that general or specific embodiments may be implemented as a system, a method, an integrated circuit, a computer program, a storage medium, or any selective combination thereof.

BRIEF DESCRIPTION OF DRAWINGS

FIG. 1A is a diagram illustrating one example of a data structure of service information in a broadcast communication cooperative service according to a first exemplary embodiment;

FIG. 1B is a diagram illustrating one example of the data structure of the service information in the broadcast communication cooperative service according to the first exemplary embodiment;

FIG. 2 is a diagram illustrating one example of a summary of a transmission path identifying descriptor according to the first exemplary embodiment;

FIG. 3A is a diagram illustrating another example of the data structure of the service information in the broadcast communication cooperative service according to the first exemplary embodiment;

FIG. 3B is a diagram illustrating another example of the data structure of the service information in the broadcast communication cooperative service according to the first exemplary embodiment;

FIG. 6A is a diagram illustrating one example of the data structure of the service information in the broadcast communication cooperative service according to a first modified example of the first exemplary embodiment;

FIG. 6B is a diagram illustrating one example of the data structure of the service information in the broadcast communication cooperative service according to the first modified example of the first exemplary embodiment;

FIG. 11A is a diagram illustrating one example of a data structure of application control information in the broadcast communication cooperative service according to a fourth modified example of the first exemplary embodiment;

FIG. 11B is a diagram illustrating one example of the data structure of the application control information in the broadcast communication cooperative service according to the fourth modified example of the first exemplary embodiment;

FIG. 12 is a diagram illustrating another example of the data structure of the application control information in the broadcast communication cooperative service according to the fourth modified example of the first exemplary embodiment;

FIG. 14 is a diagram illustrating one example of the data structure of the service information in the broadcast communication cooperative service according to a first example of a second exemplary embodiment;

FIG. 15 is a flowchart illustrating one example of the operation on the receiving side in the broadcast communication cooperative service according to the first example of the second exemplary embodiment;

FIG. 16A is a diagram illustrating one example of syntax of location information descriptor according to a second example of the second exemplary embodiment;

FIG. 16B is a diagram illustrating one example of the syntax of the location information descriptor according to the second example of the second exemplary embodiment;

FIG. 16C is a diagram illustrating one example of the syntax of the location information descriptor according to the second example of the second exemplary embodiment;

FIG. 16D is a diagram illustrating one example of the syntax of the location information descriptor according to the second example of the second exemplary embodiment;

Figure 4A:
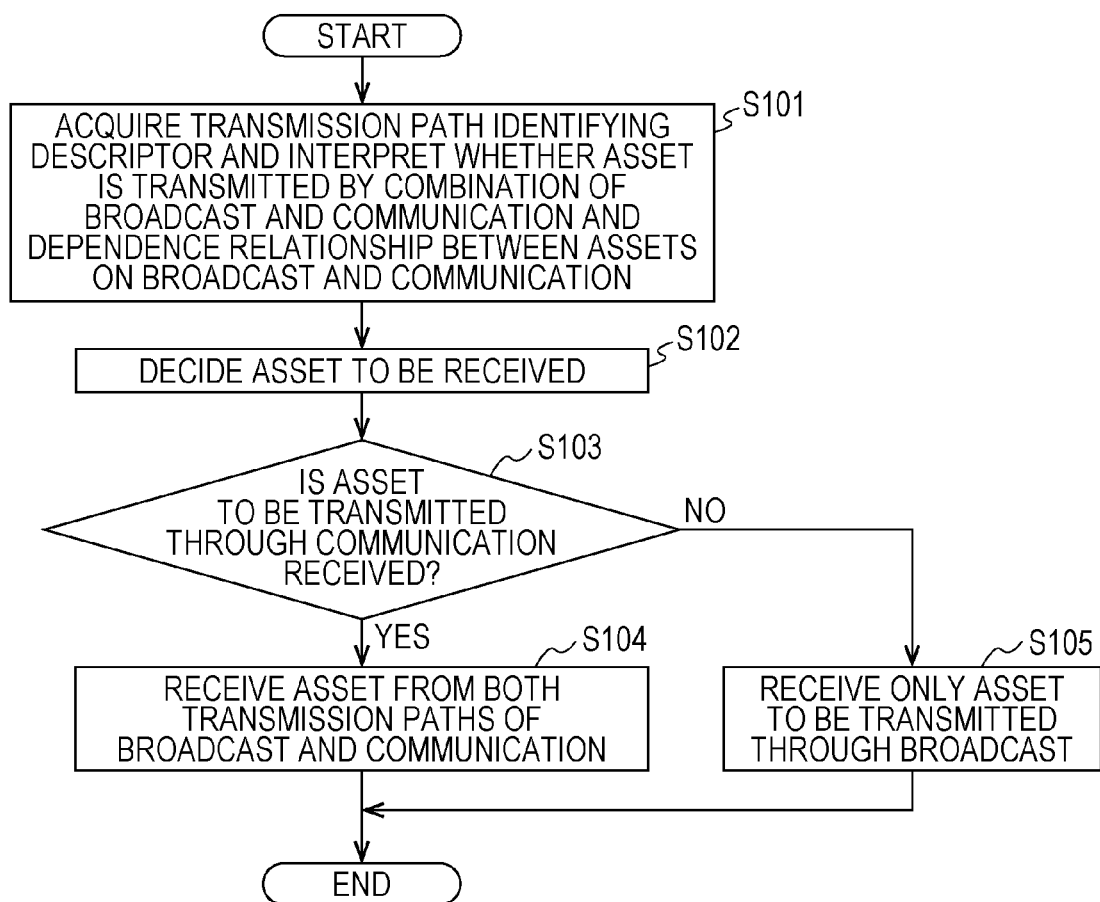
FIG. 4A is a flowchart illustrating one example of an operation on a receiving side in the broadcast communication cooperative service according to the first exemplary embodiment.

DETAILED DESCRIPTION (Underlying Knowledge Forming Basis of the Present Disclosure)

At present, a service that distributes contents using the combination of broadcast and communication (broadcast communication cooperative service) is examined. Particularly, a system that accesses to contents acquired from the communication (hereinafter, communication contents) based on data acquired mainly from broadcast offers promise. In an operation on a receiving side for receiving contents in the broadcast communication cooperative service at a viewing start time, similarly to a conventional service for distributing contents through only broadcast, after service information is acquired, start of receiving the contents through coded data of an audio and a video or data carousel in an MPEG-2 system is considered.

However, in service information that can be acquired by a conventional service, an operation for quickly accessing to communication contents and an operation for selectively receiving only broadcast contents are not considered. For this reason, when the broadcast communication cooperative service is provided by using conventional service information, a process for analyzing the service information increases or communication contents acquisition start timing is delayed.

Further, similarly in Hybridcast standards that are standardized in IPTV Forum Japan and has been already employed by ARIB standards, the operation for quickly accessing to communication contents and the operation for selecting and receiving only broadcast contents are not considered.

In the conventional Hybridcast specifications that are standardized by IPTV Forum Japan and have been already employed by the ARIB standards, an application of HTML5 is downloaded on a communication side and the application is started according to issue of an event message. For this reason, the Hybridcast does not cope with reproduction control of communication contents based on PTS (Presentation Time Stamp) and DTS (Decoding Time Stamp) in frames of audio and video on the broadcast side, and thus cannot cope with high-definition synchronous reproduction such that a display time of the broadcast contents is made to be synchronous with a display time of the communication contents in each frame.

In order to solve such a problem, a transmitting method according to one aspect of the present disclosure for transmitting contents using an broadcast wave and a communication path includes an information transmitting step of, when the contents are transmitted by using the broadcast wave and the communication path, allowing application control information to include information that is for synchronizing the contents through the broadcast wave and the contents through the communication path when the contents are received by a receiving side and that relates to the contents to be transmitted through the communication path, and transmitting the application control information using at least the broadcast wave in the broadcast wave and the communication path.

This aspect can realize a contents transmitting method that enables a quick access to contents through communication when the contents are reproduced by using the combination of broadcast and communication on the receiving side. More specifically, when contents are transmitted by using a broadcast wave and a communication path, information for synchronizing the contents using the broadcast wave and using the communication path is transmitted with this information being included in application control information. For this reason, when the receiving side receives the application control information including this information, the receiving side is enabled to quickly access to the contents using communication according to this information. As a result, the receiving side is enabled to make both the contents synchronize with each other.

For example, in the information transmitting step, prior to the transmission of the contents, the application control information is transmitted, and the application control information may further include location information indicating an acquisition destination of the contents or information indicating an acquisition destination of the location information.

Further, for example, in the information transmitting step, the application control information may be allowed to include differential information between a reference clock of the contents through the broadcast wave and a reference clock of the contents through the communication path so as to be transmitted.

Further, for example, in the information transmitting step, the application control information is transmitted, and the reference clock of the contents through the communication path is made to synchronize with the reference clock of the contents through the broadcast wave based on the differential information so that the receiving side may take the synchronization.

Further, in order to solve the above problem, a receiving method in accordance with one aspect of the present disclosure includes a receiving step of receiving contents transmitted by using an broadcast wave and a communication path, and a reproducing step of, when application control information that includes information which is for synchronizing the contents using the broadcast wave and the contents using the communication path and which relates to the contents to be transmitted through the communication path is received from at least the broadcast wave in the broadcast wave and the communication path, executing the synchronizing process so as to reproduce the contents.

For example, in the receiving step, prior to the reception of the contents, the application control information is received, and when the application control information further includes location information indicating an acquisition destination of the contents, the contents are acquired based on the location information so that the contents may be received.

Further, for example, in the receiving step, prior to the reception of the contents, the application control information is received, and when the application control information includes information indicating an acquisition destination of location information indicating an acquisition destination of the contents, the location information is acquired based on the information indicating the acquisition destination of the location information, and the contents are acquired from the acquired location information so that the contents may be received.

Further, for example, in the reproducing step, when the application control information that includes differential information between a reference clock of the contents through the broadcast wave and a reference clock of the contents through communication path is received in the receiving step, and the reference clock of the contents through the broadcast wave is different from the reference clock of the contents through the communication path, the reference clock of the contents through the communication path is made to synchronize with the reference clock of the contents through the broadcast wave based on the differential information, so that a process for synchronizing the contents with each other is executed and the contents may be reproduced.

Further, in order to solve the above problem, in accordance with one aspect of the present disclosure, a transmitting apparatus that transmits contents through a broadcast wave and a communication path includes an information transmitter that, when the contents are transmitted by using the broadcast wave and the communication path, allows application control information to include information which is for synchronizing the contents through the broadcast wave and through the communication path when a receiving side receives both the contents and which relates to the contents transmitted through the communication path, and that transmits the application control information using at least the broadcast wave in the broadcast wave and the communication path.

Further, in order to solve the above problem, in accordance with one aspect of the present disclosure, a receiving apparatus includes a receiver that receives contents transmitted by using a broadcast wave and a communication path, and a reproducer that, when application control information that is for synchronizing contents through a broadcast wave and through a communication path and that includes information about the contents to be transmitted through the communication path is received, executes the synchronizing process so as to reproduce the contents.

The generic or specific modes may be realized by the transmitting method, the transmitting apparatus, the receiving method, the receiving apparatus, an integrated circuit, a computer program, or a recording medium such as a CD-ROM readable by a computer or may be realized by any combination of the data receiving method, the integrated circuit, the computer program, and the recording medium.

The transmitting method and the receiving method according to one aspect of the present disclosure are described specifically below with reference to the drawings.

All exemplary embodiments described below illustrate one specific example of the present disclosure. Numerical values, shapes, materials, components, an arrangement position and connecting form of the components, steps, and order of the steps are examples, and thus the present disclosure is not limited by them. Further, in components described in the following exemplary embodiments, components that are not described in independent claims representing a generic concept are described as any component.

First Exemplary Embodiment

This exemplary embodiment describes a transmitting method for transmitting and receiving contents in a broadcast communication cooperative service.

[Transmitting Method]

In this exemplary embodiment, a transmitting side transmits contents (data or asset) using a broadcast wave and a communication path, but prior to the transmission of the contents, service information is transmitted.

[Service Information]

The service information indicates a series of information relating to reception of contents and acquisition of metadata such as information for acquiring an audio and a video or data relating to data broadcast after a tuning operation (after tuning), or information about EPG (Electric Program Guide).

In present broadcast, the transmission is performed mainly by using a section of MPEG-2 TS (Transport Stream). Such an MPEG-2 TS includes PAT (Program Association Table), PMT (Program Map Table), NIT (Network Information Table), CAT (Conditional Access Table), or EIT (Event Information Table) defined in ARIB (Association of Radio Industries and Businesses).

This exemplary embodiment exemplifies MMT (MPEG Media Transport) that is standardized by MPEG as a multiplexing format on a broadcast side in a broadcast cooperative service. However, this multiplexing format is not limited to MMT, and another multiplexing format such as TS or MPEG-DASH (Dynamic Adaptive Streaming over HTTP) may be used.

The service information in this exemplary embodiment is transmitted in a data structure where storing can be performed in the multiplexing format. For example, in MMT, the service information is transmitted in a format of a table such as MPT (MMT Package Table) or of message information such as PA (Package Access) message. In each of the tables, similarly to TS, auxiliary information can be described by using a descriptor.

FIG. 1A and FIG. 1B are diagrams illustrating one example of the data structure of the service information in the broadcast communication cooperative service according to the first exemplary embodiment. More specifically, FIG. 1A illustrates MPT including a transmission path identifying descriptor, and FIG. 1B illustrates an example where information about a transmission path of an asset forming a package, for example, is described as attribute information in the transmission path identifying descriptor shown in FIG. 1A.

(Attribute Information)

1) The asset forming the package may include information indicating whether transmission is performed by using (1) only broadcast or (2) the combination of the broadcast and communication as attribute information.

Editorial audio and video data may be information indicating whether the data are transmitted by using (1) only broadcast or (2) the combination of broadcast and communication. With this information, even when the editorial data is transmitted by using only broadcast, metadata separate from the editorial data such as an audio, a video, a still image, and an HTML file can be acquired from a communication network.

2) When the audio and video data are transmitted by using the combination of broadcast and communication, information indicating correlation of data to be transmitted respectively may be included as the attribute information.

For example, when scalability (temporal resolution (60 fps→120 fps), spatial resolution (4 k→8 k), and a bit depth (8 bit→10 bit)) are realized, the attribute information enables the transmission through broadcast using a basic layer and the transmission through communication using an extended layer. The attribute information may indicate that a frame rate of only the broadcast data is 60 fps, but the combination of the broadcast data and the communication data can improve the frame rate to 120 fps. Further, the attribute information may indicate that data for broadcast backup is transmitted through communication. As a result, when a broadcast receiving condition is deteriorated by rain attenuation, the transmitting side can switch the transmission of data into transmission of data through the communication using the attribute information.

Further, the attribute information may indicate information for identifying assets that are related to each other. For example, the attribute information may indicate an asset ID of a basic layer and an asset ID of an extended layer corresponding to the basic layer.

In MMT, the same assets can be transmitted by using a plurality of transmission paths. Therefore, the attribute information may indicate whether the same assets are transmitted by using the combination of broadcast and communication. At this time, the asset identifying information (the asset IDs) may be additionally indicated. The information for identifying the related assets may be indicated by, for example, as shown in FIG. 2, individual transmission path identifying descriptors for the respective assets. FIG. 2 is a diagram illustrating one example of a summary of the transmission path identifying descriptor according to the first exemplary embodiment. The individual transmission path identifying descriptors shown in FIG. 2 may indicate, for example, information for identifying the asset as an asset of the basic layer or identifying an asset of the extended layer, or an asset ID of the corresponding basic layer when the asset is of the extended layer.

Further, the attribute information indicates a list of the assets included in a group where broadcast assets and communication assets are grouped. When assets using the combination of broadcast and communication are present, they may be additionally grouped.

3) The attribute information may include information indicating whether an audio and a video to be transmitted through broadcast are synchronized with an audio and a video to be transmitted through communication and they are reproduced.

Each attribute information may be indicated as each field, or information indicating each service type is defined so that each attribute information can be identified according to each type. Further, the attribute information may be described in a format different from the descriptor.

Further, the transmission path identifying descriptor may be stored in a table or a message indicating information per package different from MPT. Further, contents of the transmission path identifying descriptor may be described as a data structure different from the descriptor.

Further, when a plurality of packages is transmitted, a table and a message representing a list of the packages are defined, and information about each package such as the transmission path identifying descriptor may be indicated as the attribute information about each package.

FIG. 3A and FIG. 3B are diagrams illustrating another examples of the data structure of the service information in the broadcast communication cooperative service according to the first exemplary embodiment.

That is to say, as shown in FIG. 3A and FIG. 3B, location information about the assets to be transmitted through broadcast and communication may be stored in different MPTs. At this time, the attribute information about the package can be stored in MPT to be sent through a transmission path to be an entry point of the service. For example, when broadcast is the entry point, the attribute information is stored in MPT to be sent through broadcast. Further, these MPTs are identified by "table_id".

In the MMT standards, since a value of "table_id" of MPT to be a reference is defined as zero, "table_id" of MPT corresponding to the transmission path to be the entry point can be set to zero, and "table_id" of MPT corresponding to the other transmission path can be set to 1 or more.

MPT of the broadcast asset may be transmitted through broadcast and MPT of the communication asset may be transmitted through communication.

Further, the location information about the broadcast assets and the location information about the communication assets may be stored in one MPT. In this case, each location information of each asset may be stored sequentially so as to be easily identified. For example, when N1 broadcast assets and N2 communication assets are present, information about the N1 broadcast assets is sequentially described, and then information about the N2 communication assets is sequentially described. The transmission path identifying descriptor may indicate that, N1 assets are transmitted through broadcast and N2 assets are transmitted through communication.

On the transmitting side, the transmission path identifying descriptor that is auxiliary information is made to be included in service information so as to be transmitted. As a result, on the receiving side, only when the service information including the auxiliary information is acquired, the attribute information about the package described in the transmission path identifying descriptor enables advanced acquisition of whether communication data is included or not, or a dependence relationship between broadcast data and communication data can be acquired without analyzing the information about each asset.

Particularly when communication data is received, a delay time relating to starting of the receiving process can be shortened.

[Receiving Apparatus]

For example, the transmitting apparatus in this exemplary embodiment is capable of transmitting contents using a broadcast wave and a communication path. The transmitting apparatus generates the attribute information of the package such as transmission path identifying descriptor as the auxiliary information and allows the attribute information to be included in service information so as to transmit the service information.

The transmitting apparatus of this exemplary embodiment may periodically transmit the service information. When contents of the service information are updated, the updated contents are reflected in the service information just after the update.

Further, the entry point is not limited to broadcast and may be communication or entry may be enabled from both broadcast and communication. When the entry is enabled from both broadcast and communication, the information about each package is transmitted from at least both transmission apparatuses on broadcast and communication.

When the contents of the broadcast communication cooperative service are received on the receiving side, data transmitted from both the transmission paths does not always have to be received. For example, only broadcast data may be received so to be reproduced. At this time, since information that is necessary when the receiving side receives communication data is not necessary when broadcast data is received, the transmitting side may transmit the information necessary for the reception of the communication data in communication. That is to say, the transmitting side may transmit the information about each package on the transmission path to be the entry point, and may transmit information specific to the transmission paths of broadcast and communication on the respective transmission paths (for example, FIG. 2). In the following description, broadcast is the entry point.

As a result, the service information specific to each transmission path can be generated so as to be transmitted by the transmitting apparatus on each of the transmission paths. Information such as the location information about assets to be transmitted as MPT is collectively acquired at first, so that the delay time relating to the start of asset acquisition on the communication side can be reduced and thus the information may be transmitted through broadcast.

Example of Information Specific to Communication

An example of information specific to communication (communication networks such as internet and CDN (Contents Delivery Network) is described.
1) Information relating to FEC (Forward Error Correction) in a packet to be transmitted through communication, such as an FEC system and parameters
2) Information relating to QoS (Quality of Service) control such as a packet loss rate, a jitter of a packet arrival time, RTT (Round Trip Time), or an end-to-end delay on a communication transmission path
3) Information relating to buffering between reception of asset data such as a buffering time and a buffering amount and start of decoding.

Also in broadcast, particularly broadcast for a mobile body (1-segment broadcast in Japan), FEC and QoS are important, but parameters in them are different from parameters on the communication path. For this reason, the information specific to broadcast may be transmitted only in broadcast.

On the other hand, in communication, a plurality of audio and video data, such as a bit frame and a frame rate, can be selected according to a band frequency of a communication network. At this time, information indicating correspondence between attribute information (bit rate or the like) and asset IDs of selectable data may be transmitted. The relation information may be transmitted also in broadcast.

Information indicating whether a plurality of selectable assets is present may be indicated as the correspondence information, or when the plurality of selectable assets is present, a list about the plurality of selectable assets may be indicated.

[Receiving Method]

In this exemplary embodiment, the receiving side starts to receive (acquire) contents after acquisition of service information. The receiving method in this exemplary embodiment is described below with reference to the drawings.

FIG. 4A is a flowchart illustrating one example of an operation on the receiving side in the broadcast communication cooperative service according to the first exemplary embodiment. FIG. 4A illustrates an operation of the receiving apparatus for acquiring the transmission path identifying descriptor in this exemplary embodiment and deciding assets to be received.

An MPT table included in a PA message or an MPT message is acquired as service information to be transmitted on the transmission path to be the entry point, and a transmission path identifying descriptor included in the table is acquired.

Information about the transmission path identifying descriptor, such as whether assets are transmitted by using the combination of broadcast and communication and a dependence relationship between the broadcast assets and the communication assets when both the transmission paths are used, is interpreted (step S101).

A message such as the PA message is stored in a payload of a packet such as an MMT packet, and a type of data to be stored is represented by a packet header. Therefore, when an MMT package is received, the MMT packet in the PA message is acquired first with reference to an ID number in the packet header (corresponding to "packet_id" in the MMT packet).

An asset to be received is decided based on a reproducing ability of a terminal or whether the communication path can be used (step S102).

An example of an asset deciding method is described.

1) When the receiving apparatus is not connected to a communication network, a decision is made that only a broadcast asset is received. At this time, an asset to be transmitted by using the combination of broadcast and communication is not received.

2) When a basic layer of a video is transmitted through broadcast and an extended layer of the video is transmitted through communication, a decision is made that when only the basic layer can be reproduced, only the broadcast data is received, and when both the layer can be reproduced, both broadcast data and communication data are received. For example, time scalability of 60 fps can be realized only in the basic layer and time scalability of 120 fps can be realized in the basic layer and the extended layer. In this case, when the receiving apparatus can perform decoding and display at only up to 60 fps, only broadcast data is received, and when the receiving apparatus can perform decoding and display at up to 120 fps, both broadcast data and communication data are received.

3) Receivable assets are decided selectively from a plurality of assets with different bit rates to be transmitted through communication according to the band frequency of the communication network to be connected by the receiving apparatus. Information about the bit rates of the respective assets is transmitted separately as service information. A decision may be made that when a reception state is not satisfactory due to congestion of the communication network and assets that can be stably received are not present, data on the communication side is not received.

4) Further, in preparation for environment deterioration of broadcast reception, when data for backup is transmitted in communication, an asset to be acquired may be decided when the reception environment is deteriorated. In this case, the receiving apparatus monitors the reception environment, and a decision is made based on an index such as an error rate in the reception data whether the communication asset is received, so that a receiving process may be executed.

5) When data to be reproduced synchronously with audio data and video data of editorial data to be transmitted through broadcast (data about an extended layer in a video) is received through communication, a special operation for buffering data before start of the reproduction is occasionally required for ensuring the synchronization between the data received through broadcast and the data received through communication. In this case, only an asset, which does not need definite synchronization with the data to be transmitted through broadcast (for example, synchronization in unit of frame), may be received through communication. For example, a decision may be made that an asset including data of HTML, a still image and a moving image that does not need definite synchronization may be acquired through communication.

The description is give below with reference to a flowchart in FIG. 4A.

A decision (determination) is made in step S103 whether an asset to be transmitted through communication is received, and when the decision (determination) is made that the asset is received (Yes in S103), the sequence goes to S104, and when the decision (determination) is made that the asset is not received (No in S103), the process goes to S105.

The asset is received from both the transmission paths of broadcast and communication in S104, and the asset is received only through broadcast in S105.

Figure 4B:
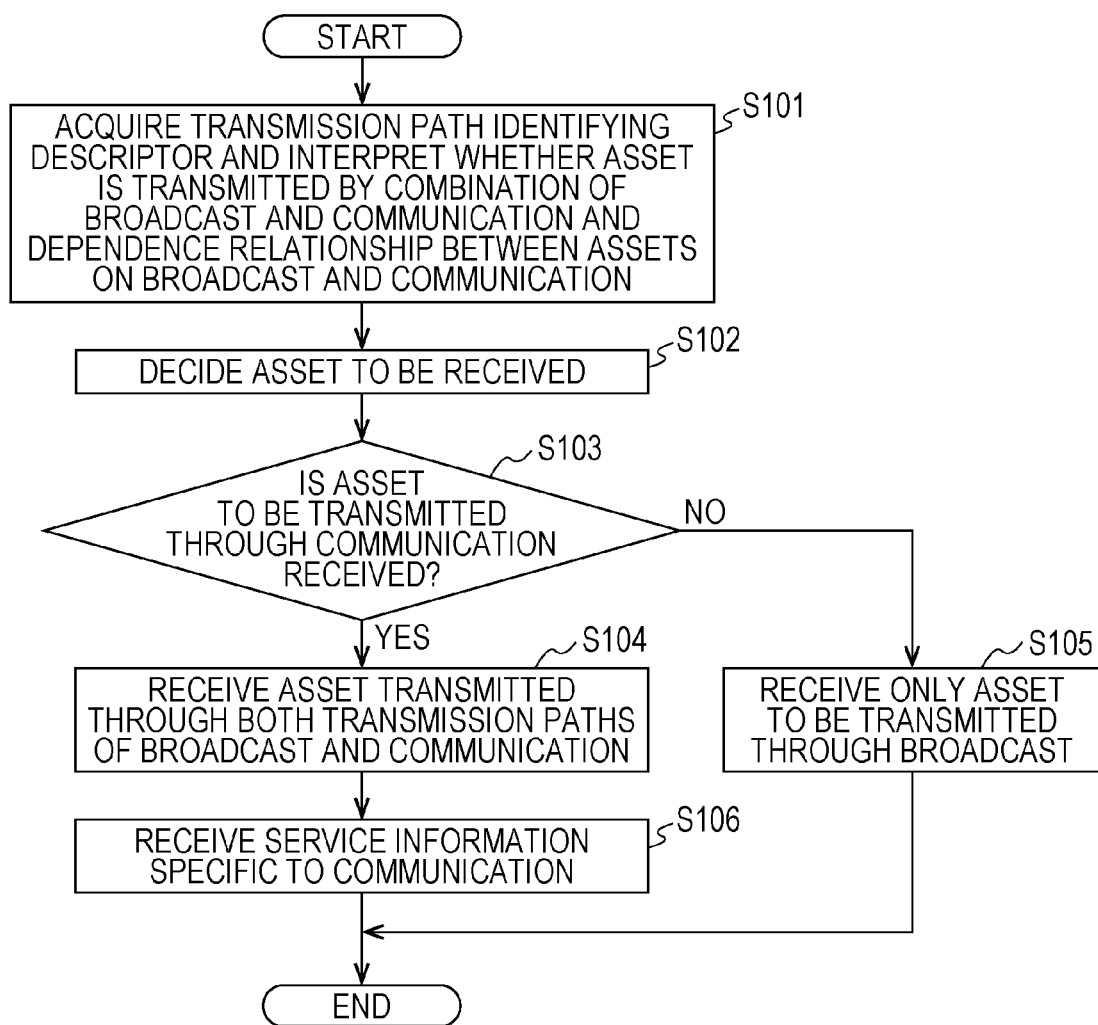
FIG. 4B is a flowchart illustrating another example of the operation on the receiving side in the broadcast communication cooperative service according to the first exemplary embodiment.

FIG. 4B is a flowchart illustrating another example of the operation on the receiving side in the broadcast communication cooperative service according to the first exemplary embodiment.

In comparison between FIG. 4B and FIG. 4A, a step of, when service information specific to communication is transmitted through communication, receiving the service information (step S106) is added in FIG. 4B. Since the other parts are similar to those described in FIG. 4A, description thereof is omitted.

When service information specific to broadcast is present, it is additionally received in a step, not illustrated.

Further, when the receiving apparatus does not cope with the broadcast communication cooperative service, only broadcast asset may be received. In this case, when an asset to be transmitted by using the combination of broadcast and communication is present, the asset is not received.

[Receiving Apparatus]

Figure 5:
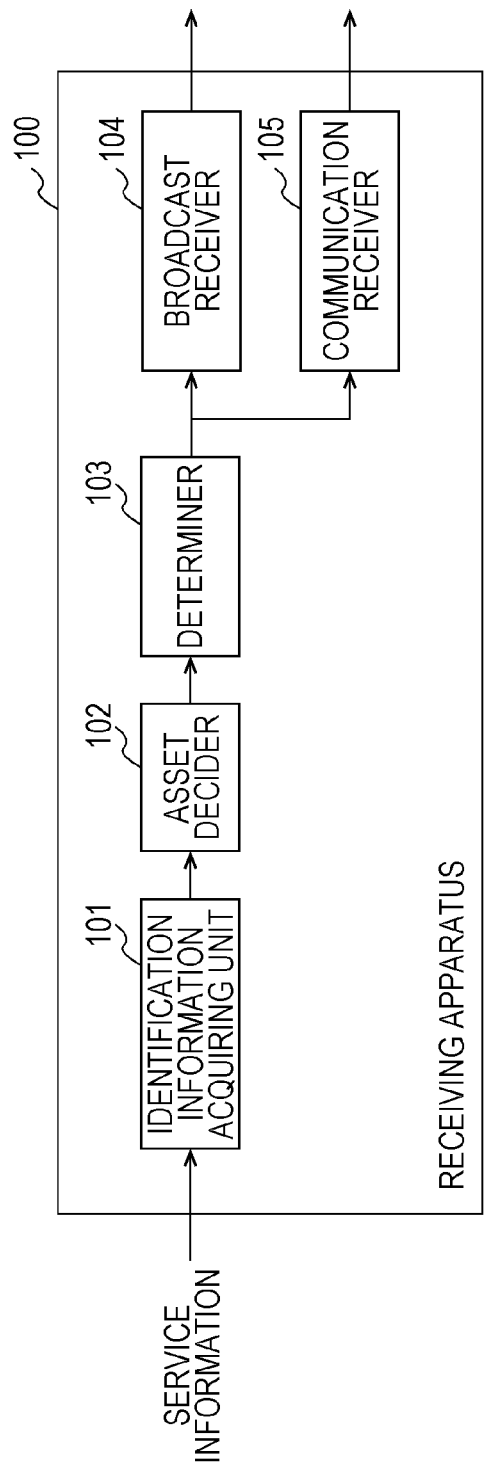
FIG. 5 is a block diagram illustrating one example of a constitution of a receiving apparatus according to the first exemplary embodiment.

FIG. 5 a block diagram illustrating one example of a constitution of the receiving apparatus according to the first exemplary embodiment. FIG. 5 illustrates one example of the constitution of the receiving apparatus realizing the receiving method described with reference to FIG. 4A.

Receiving apparatus 100 illustrated in FIG. 5 includes identification information acquiring unit 101, asset decider 102, determiner 103, broadcast receiver 104, and communication receiver 105.

The identification information acquiring unit 101 has a function that realizes step S101 illustrated in FIG. 4A. Specifically, identification information acquiring unit 101 acquires service information to be transmitted on a transmission path to be the entry point, and acquires a transmission path identifying descriptor (auxiliary information) included in the service information. Identification information acquiring unit 11 interprets information about the transmission path identifying descriptor.

Asset decider 102 has a function that realizes step S102 illustrated in FIG. 4A, and decides an asset to be received based on a reproducing ability of a terminal or whether the communication path can be used.

Determiner 103 has a function that realizes step S103 illustrated in FIG. 4A, and decides (determines) whether the asset to be transmitted through communication is received. Specifically, determiner 103 determines whether the communication data is received, and when determiner 103 determines that it is received, broadcast receiver 104 and communication receiver 105 receive data of the asset decided in step 102.

When determiner 103 determines that the communication data is not received, only broadcast receiver 14 receives the data.

First Modified Example

This modified example describes an example where broadcast transmission is performed by using TS, and communication transmission is performed by using DASH or RTP (Real-time Transport Protocol).

FIG. 6A and FIG. 6B are diagrams illustrating one example of the data structure of the service information in the broadcast communication cooperative service according to the first modified example of the first exemplary embodiment. FIG. 6A illustrates an example where information about data to be transmitted through communication is stored in PMT. FIG. 6B illustrates one example of the data structure of the transmission path identifying descriptor according to this modified example.

In this modified example, the transmission path identifying descriptor indicating the attribute information described with reference to FIG. 1A and FIG. 1B is stored in PMT as one example of the service information.

The program information in TS such as PMT indicates only location information of data to be transmitted through TS. For this reason, in this modified example, when contents data is transmitted by the combination of communication and broadcast, the location information about the communication data is stored in the transmission path identifying descriptor. More specifically, the attribute information includes flag information indicating whether communication is also used. As a result, the transmitting side can make selection whether the location information about the communication data is included according to a value of the flag information. The location information is not limited to the storage in the transmission path identifying descriptor. A descriptor may be additionally defined so that the location information is stored.

(Location Information)

The location information is information indicating a data acquisition destination, and corresponds to PID in a case of TS, and corresponds to URL or URI in a case of communication.

As the location information, MPD (Media Presentation Description) of DASH or SDP (Session Description Protocol) in RTP may be stored.

Further, the location information is not limited to storage of entity data of the location information such as MPD and SDP, and information indicating an acquisition destination of the entity data in the location information may be stored in location information. The information indicating the acquisition destination of the entity data in the location information is, for example, information indicating URL for acquiring MPD. When the information indicating the acquisition destination of the entity data of the location information is stored in the location information, a delay occurs due to the additional acquisition of the entity data of the location information. For this reason, from a viewpoint of reducing a delay until the start of the reception of the communication data, it is desirable that the entity data is stored directly in the location information.

Since MPD of DASH includes various information relating to the acquisition destination of the contents, a size of MPD is large. Therefore, MPD is not stored directly in the location information, and subset information including only information relating to URL of the contents acquisition destination and relating to DTS and PTS of a segment may be stored in the location information.

Further, it is desirable that the contents of the location information such as MPD can be updated.

For example, a version number may be given to the location information. As a result, when the version number is updated, the location information can be reacquired. Information about the transmission path identifying descriptor in PMT to be periodically transmitted may be successively checked in order to check whether the version number is updated. However, since the successive checking process is heavy, section data for storage of the location information may be additionally generated (referred to as transmission path identifying section) so as to be periodically transmitted.

In the receiving apparatus, the version number in the transmission path identifying section is checked so that a determination can be made whether the location information is updated. In both program information such as PMT and the transmission path identifying section, the attribute information and the location information may be transmitted. Alternatively, only the location information may be stored in the transmission path identifying section.

Further, after acquisition of communication data is started based on the location information acquired through broadcast, updated contents of the location information may be acquired through communication. At this time, since the acquisition destination of the location information is required, the acquisition destination of the location information as well as the entity data of the location information may be stored in the transmission path identifying descriptor of broadcast.

The receiving apparatus periodically accesses to the acquisition destination of the location information so as to be capable of acquiring the updated contents through communication.

Further, when a system of a message exchange between a distributing server of DASH contents and the receiving apparatus is present, the server may issue a message indicating the updating of the location information to the receiving apparatus. When the receiving apparatus receives the message, the location information may be reacquired.

The description refers to that the information about the data to be transmitted through communication is store in PMT, but the present disclosure is not limited to this. The attribute information and the location information may be transmitted through a section different from PMT.

Further, the method for acquiring the communication data may be switched based on whether the data to be transmitted through communication is reproduced synchronously with an audio and a video on broadcast.

For example, when the synchronous reproduction is performed, the communication data is enabled to be accessed from the broadcast program information as described above. When the synchronous reproduction is not performed, AIT (Application Information Table) defined for a hybrid cast specification in ARIB (Association of Radio Industries and Businesses) is used so that information for an access to the communication data may be transmitted by data broadcast. The receiving apparatus receives AIT in a format of a table or a carousel, and acquires communication data based on contents of AIT. The acquired communication data is started to be reproduced after the reception of an event message to be transmitted through data broadcast.

Also when the broadcast data and the communication data are synchronously reproduced, information such as AIT may be used. At this time, reproduction start and end times of the communication data are indicated in the data broadcast. In the receiving apparatus, the communication data is reproduced according to these times.

MPD of DASH, and SDP of RTP can indicate a reproduction start time or a decoding start time of contents, and these times are specified based on reference clocks defined for respective multiplexing and transmitting systems such as UTC (Coordinated Universal Time). Further, also PTS (Presentation Time Stamp) and DTS (Decoding Time Stamp) of individual video frames and audio samples are set based on the reference clocks. On the other hand, since PCR (Program Clock Reference) is a reference clock in broadcast, when the broadcast data and the communication data are synchronously reproduced, information indicating a correlation between both reference clocks is required.

Therefore, information indicating the correlation between the reference clocks of the broadcast data and the communication data may be included in program information of PMT in broadcast. For example, the information may be such that a time at which a value of PCR in broadcast is N1 and a time at which a value of UTC in communication is N2 may be matched with each other. These pieces of information may be included in MPD and SDP.

Further, the transmission path identifying descriptor may indicate information about a protocol of a transport layer such as whether the communication data is transmitted according to UDP (User Datagram Protocol) or TCP (Transmission Control Protocol). As a result, in the receiving apparatus, a determination can be made whether a port to be used in each protocol is opened or whether the port copes with the protocol to be used.

Further, a discrimination may be made whether the multiplexing format in the communication data is DASH or RTP by presenting identification information of the multiplexing format in the communication data.

[Receiving Method]

As the receiving method in this modified example, the following describes one example of the operation of the receiving apparatus in a case where the transmission is performed in broadcast by using TS and the transmission is performed in communication by using DASH or RTP (Real-time Transport Protocol) with reference to the drawings.

Figure 7A:
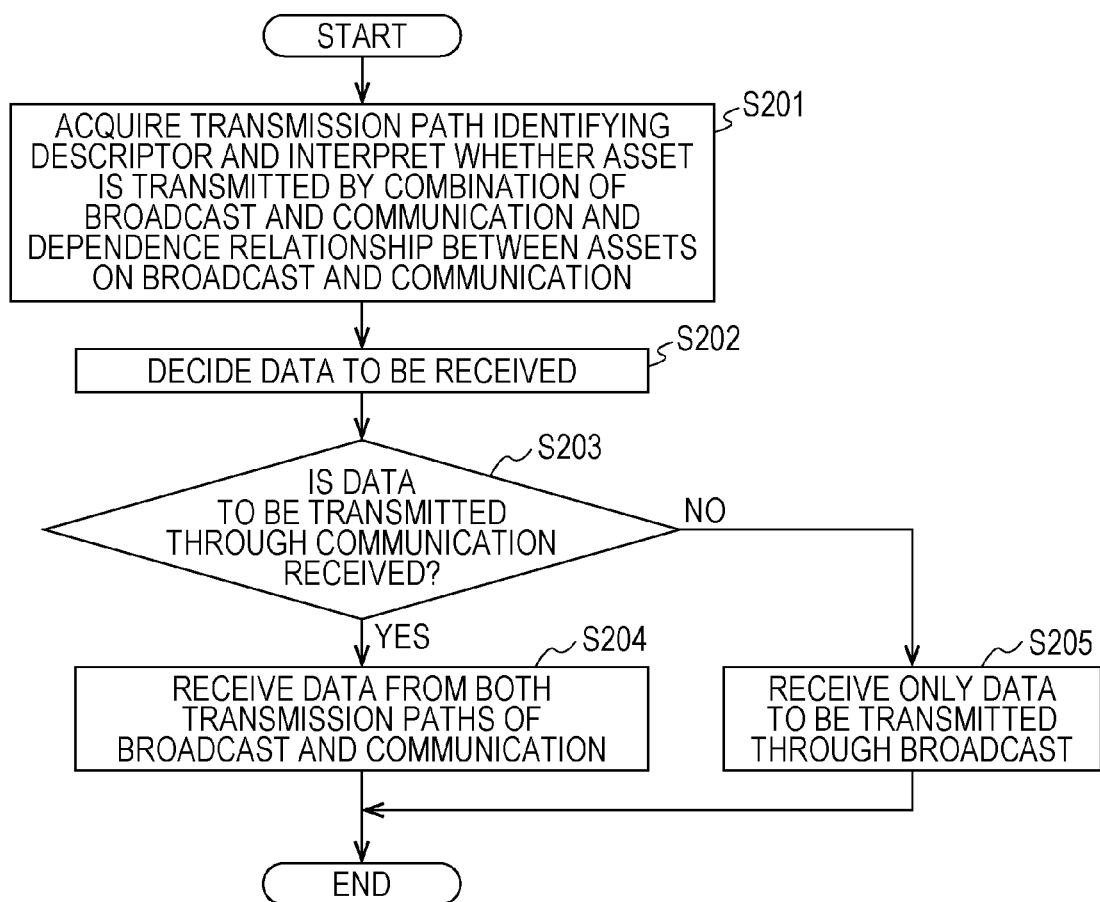
FIG. 7A is a flowchart illustrating one example of the operation on the receiving side in the broadcast communication cooperative service according to the first modified example of the first exemplary embodiment.

FIG. 7A is a flowchart illustrating one example of the operation on the receiving side in the broadcast communication cooperative service according to the first modified example of the first exemplary embodiment. FIG. 7A illustrates one example of the operation of the receiving apparatus when the attribute information and the location information are stored in the broadcast program information.

The operation in steps (step S201 to step S205) is similar to the operation of the flowchart in FIG. 4A, but in FIG. 4A, the broadcast data and the communication data are made to be uniform by an asset of an MMT package. On the contrary, in FIG. 7A, data of TS is transmitted on the broadcast, and data of DASH or RTP is transmitted on the communication side. Since the parts other than the above point are as described with reference to FIG. 4A, detailed description thereof is omitted.

Figure 7B:
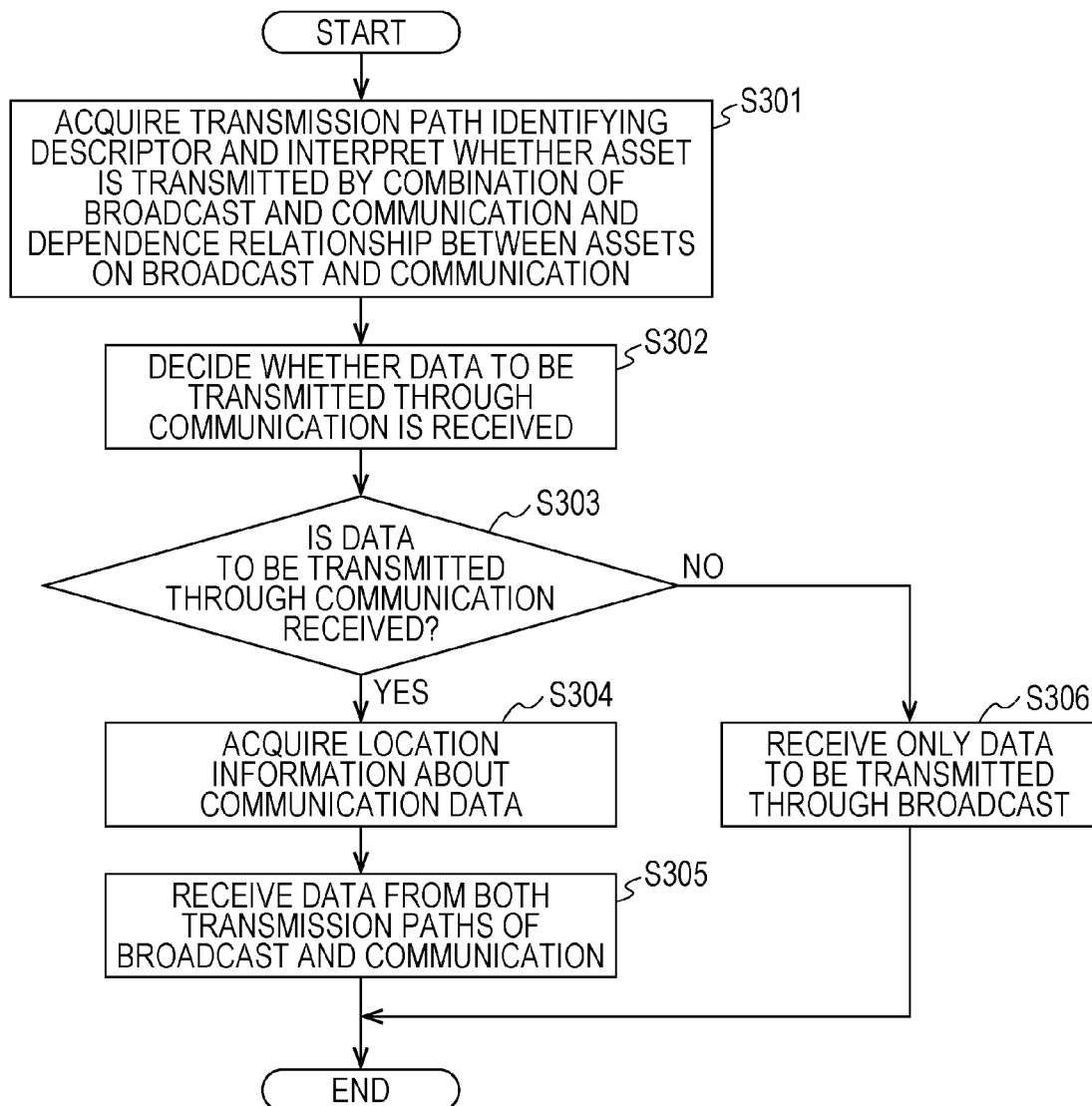
FIG. 7B is a flowchart illustrating another example of the operation on the receiving side in the broadcast communication cooperative service according to the first modified example of the first exemplary embodiment.

FIG. 7B is a flowchart illustrating another example of the operation on the receiving side in the broadcast communication cooperative service according to the first modified example of the first exemplary embodiment. FIG. 7B illustrates one example of the operation when access information for acquiring the attribute information and the location information is stored in the broadcast program information and entity of the location information is not stored therein.

Since step S301 is similar to step S201, description thereof is omitted.

A decision (determination) is made in step S302 whether communication data is received. When the communication data is received in step S303, the sequence goes to S304, and when the communication data is not received, the sequence goes to S306.

The location information is acquired according to the acquisition destination of the location information of the communication data included in the broadcast program information in step S304.

On the other hand, in step S305, the communication data is acquired based on the location information acquired in S304, and the broadcast data is acquired. Further, only data to be transmitted through broadcast is acquired in S306.

(Attribute Information)

The attribute information is similar to the contents described in the first exemplary embodiment, but since the first exemplary embodiment describes MMT as an example, the following describes an example where TS is used in broadcast and DASH or RTP is used in communication.

1) Information, which indicates whether audio data and video data forming contents are transmitted by (1) a method using only broadcast or (2) a method using the combination of broadcast and communication, may be included as the attribute information.

Audio and video data may be the information indicating whether the data are transmitted by (1) the method using only broadcast or (2) the method using the combination of broadcast and communication. Even when editorial data is transmitted by only broadcast, this method enables an audio, a video, a still image or metadata such as an HTML file to be acquired from a communication network different from the communication network used for the editorial data.

2) When the audio data and video data are transmitted by using the combination of broadcast and communication, information representing a correlation of data to be transmitted respectively may be included as the attribute information.

For example, when scalability (temporal resolution (60 fps→120 fps), spatial resolution (4 k→8 k), and a bit depth (8 bit→10 bit)) are realized, the attribute information can indicate that a basic layer is used for the transmission through broadcast and an extended layer is used for the transmission through the communication. As a use case, the attribute information may indicate that a frame rate of only the broadcast data is 60 fps, but the combination of the broadcast data and the communication data can improve the frame rate to 120 fps. Further, the attribute information may indicate that data for broadcast backup is transmitted through communication. As a result, when a broadcast receiving condition is deteriorated due to rain attenuation, the transmitting side can switch the transmission of data into transmission of data through communication using the attribute information.

Further, the attribute information may indicate information for identifying encoded streams related to reach other. For example, the attribute information can indicate video data identification information such as PID of a TS packet for storing data of a basic layer to be transmitted through broadcast, a segment in DASH data to be transmitted through communication, or a track ID in MP4.

Further, the attribute information may indicate information indicating broadcast data and communication data to be reproduced synchronously with each other. As a result, the transmitting side can transmit videos from a plurality of view angles or videos of a master image and a slave image in a picture-in-picture through broadcast and communication.

3) Information that indicates whether the audio and the video transmitted through broadcast and the audio and the video transmitted through communication are synchronously reproduced may be included as the attribute information.

4) Information that indicates whether clock information of the audio and the video transmitted through broadcast is identical to clock information of the audio and the video transmitted through communication may be included as the attribute information.

5) Information that indicates whether communication data is live contents may be included as the attribute information.

For example, when contents to be broadcasted are not live contents, data after a current time (T1) can be acquired. Therefore, when the reception is started from data whose reproduction time is a time (T2) acquired by adding a total sum (ΔT) of a time during contents acquisition request through start of reception (or its estimated value) and a data buffering time to the current time, the broadcast data can be reproduced without a delay. At this time, the reproduction of the communication data is started at time T2. On the other hand, when contents to be transmitted is live contents, the broadcast data is buffered only by ΔT, so that the reproduction of both the broadcast data and the communication data may be started at time T2.

When the transmitting side multi-casts or broadcasts contents using RTP, data after the current time cannot be acquired regardless of whether the contents are live contents or not. Therefore, information indicating whether the communication data is for multi-cast or broadcast may be also included in the attribute information.

[Receiving Apparatus]

The following describes one example of a constitution of the receiving apparatus when the transmission through broadcast is performed by using TS, and the transmission through communication is performed by using DASH or RTP (Real-time Transport Protocol).

Figure 8:
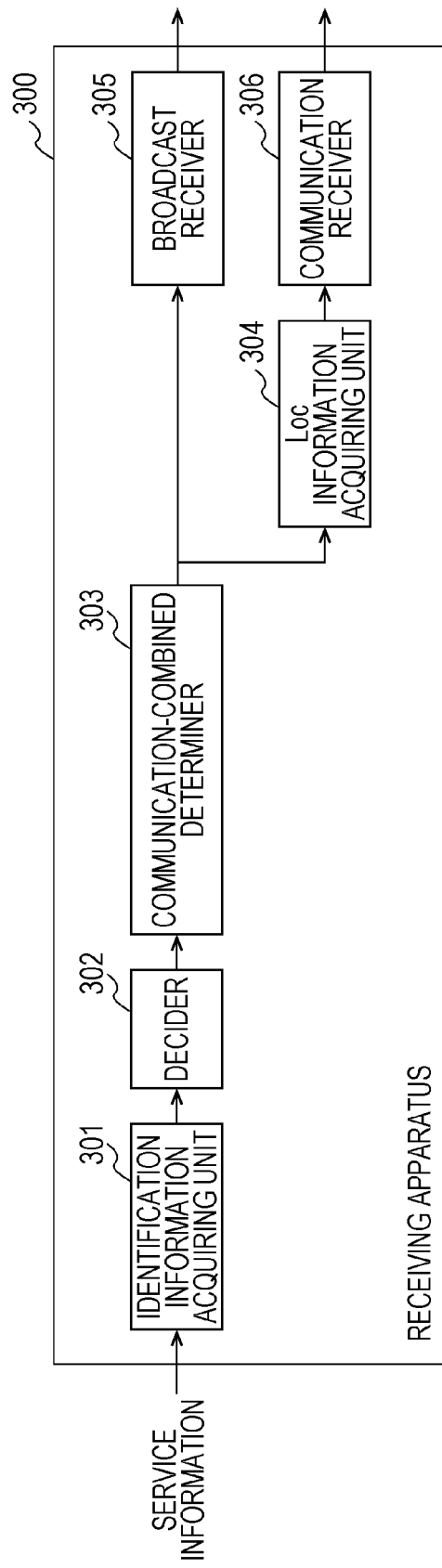
FIG. 8 is a block diagram illustrating one example of a constitution of a receiving apparatus according to the first modified example of the first exemplary embodiment.

FIG. 8 is a block diagram illustrating one example of a constitution of the receiving apparatus according to the first modified example of the first exemplary embodiment. FIG. 8 illustrates one example of the constitution of the receiving apparatus realizing the receiving method described with reference to FIG. 7B.

Receiving apparatus 300 illustrated in FIG. 8 includes identification information acquiring unit 301, decider 302, communication-combined determiner 303, Loc information acquiring unit 304, broadcast receiver 305, and communication receiver 306. The constitution of the receiving apparatus that realizes the receiving method realizing FIG. 7A corresponds to a case where Loc information acquiring unit 304 is not present in FIG. 8.

Identification information acquiring unit 301 has a function that realizes step S301 illustrated in FIG. 7B. Specifically, identification information acquiring unit 301 acquires service information to be transmitted on the transmission path to be the entry point, and acquires a transmission path identifying descriptor (auxiliary information) included in the service information. Identification information acquiring unit 301 interprets information of the transmission path identifying descriptor.

Decider 302 has a function that realizes step S302 illustrated in FIG. 7B, and decides data to be received based on a reproducing ability of a terminal or whether the communication path can be used.

Communication-combined determiner 303 has a function that realizes step S103 illustrated in FIG. 7B, and decides (determines) whether the data to be transmitted through communication is received.

Loc information acquiring unit 304 has a function that realizes step S304 illustrated in FIG. 7B, and acquires location data of the communication data.

Second Modified Example

This modified example describes one example of the receiving method when the attribute information and the location information are stored in broadcast program information and are transmitted.

[Receiving Method]

Figure 9:
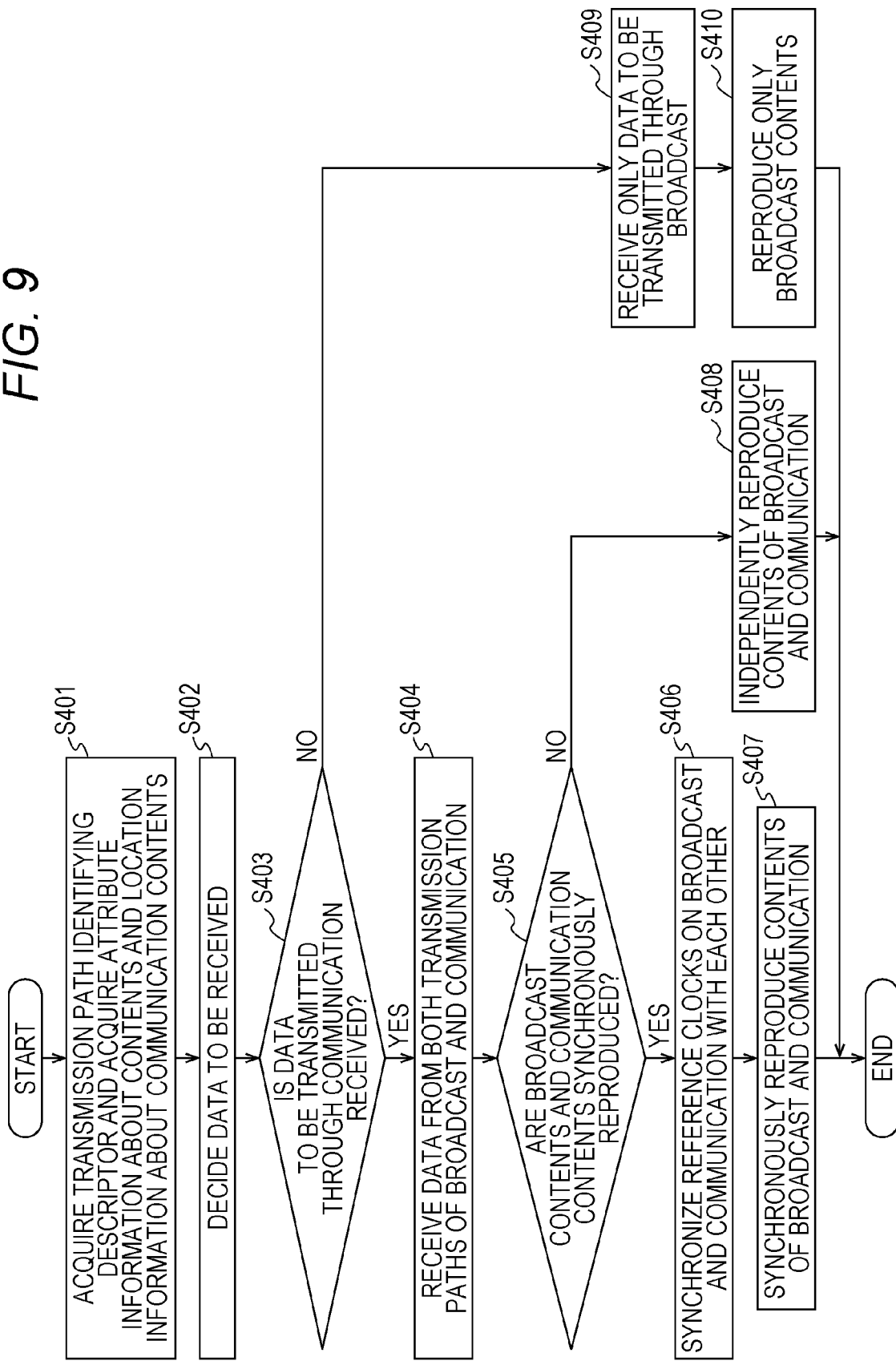
FIG. 9 is a flowchart illustrating one example of the operation on the receiving side in the broadcast communication cooperative service according to a second modified example of the first exemplary embodiment.

FIG. 9 is a flowchart illustrating one example of the operation on the receiving side in the broadcast communication cooperative service according to the second modified example of the first exemplary embodiment. FIG. 9 illustrates an operation example such that when the attribute information and the location information are stored in the broadcast program information and are transmitted, the receiving apparatus determines whether broadcast contents and communication contents are synchronously reproduced, and both the contents are reproduced.

The operation in FIG. 9 is based on the operation in FIG. 7A, but is an example when transmission data is made to be an asset of MMT but to be more general contents.

Program information to be transmitted through the transmission path to be the entry point is acquired, and a transmission path identifying descriptor included in the program information is acquired, and the attribute information of contents and the location information of communication contents are acquired (step S401).

When an entity of the location information is not stored in the program information, entity data of the location information is acquired by a method similar to the method described with reference to FIG. 7B.

Data to be received is decided based on a reproducing ability of the receiving apparatus or whether the communication path can be used (step S402).

A decision is made whether the communication contents are acquired (step S403), and when the decision is made that the communication contents are acquired (Yes in S403), the process goes to step S404, and the data is received from both the broadcast and communication transmission paths. When the decision (determination) is made that the communication contents are not acquired (No in S403), the sequence goes to step S409, and the data is received only through broadcast so that only the broadcast contents are reproduced in step S410.

A determination is, then, made whether the broadcast contents and the communication contents are synchronously reproduced (step S405).

When the determination is made that both the contents are synchronously reproduced (Yes in S405), a reference clock of broadcast contents is allowed to synchronize with a reference clock of the communication contents in step S406 so that both the contents are synchronously reproduced in step S407.

The synchronization of the reference clocks in S406 may be performed prior to S404. This is because when reception data of contents is buffered and started to be reproduced, after a check is made that data whose PTS is T1 in the broadcast contents and data whose PTS is T1 in the communication contents (their PTSs are made to be synchronized with each other) are already received, these data are decoded and the reproduction of the data is started in some cases, and when a determination is made whether the data to be synchronously reproduced are present, it is necessary that the reference clocks of both of them already synchronize with each other.

Further, in the synchronization between the reference clocks in S406, the reference clock used in broadcast can be matched with the reference clock used in communication and vice versa. For example, when PCR (Program Clock Reference) is used in broadcast and NTP (Network Time Protocol) is used in communication, DTS and PTS in a video and an audio on an NTP basis are converted into DTS and PTS on a PCR basis, so that the reference clocks in broadcast and communication can be synchronized with each other. Further, DTS and PTS of broadcast and communication may be converted in order to take synchronization of specific clocks to be used in the receiving apparatus.

The operation when the attribute information and the location information are stored in the broadcast program information so as to be transmitted is described with reference to FIG. 9. However, when the synchronous reproduction is not necessary, the transmission path identifying descriptor in which these pieces of information are described does not have to be stored in the broadcast program information.

Further, in the synchronization between the reference clocks, the reference clock used in broadcast can be matched with the reference clock used in communication and vice versa. For example, when PCR (Program Clock Reference) is used in broadcast and NTP (Network Time Protocol) is used in communication, DTS and PTS in a video and an audio on the NTP basis are converted into DTS and PTS on the PCR basis, so that the reference clocks in broadcast and communication can be synchronized with each other. DTS and PTS of broadcast and communication may be converted in order to take synchronization of specific clocks to be used in the receiving apparatus.

[Receiving Apparatus]

Figure 10:
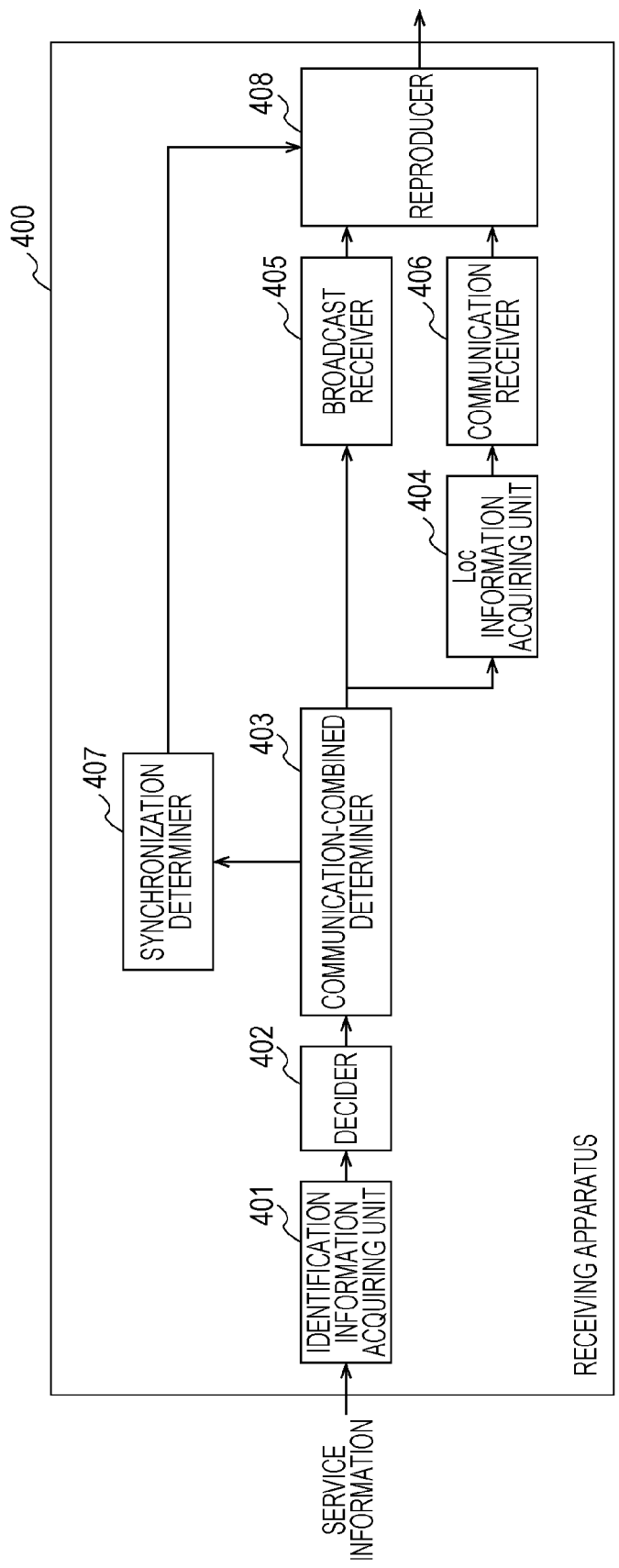
FIG. 10 is a block diagram illustrating one example of a constitution of the receiving apparatus according to the second modified example of the first exemplary embodiment.

FIG. 10 is a block diagram illustrating one example of a constitution of the receiving apparatus according to the second modified example of the first exemplary embodiment. FIG. 10 illustrates one example of the constitution of the receiving apparatus realizing the receiving method described with reference to FIG. 9.

Receiving apparatus 400 illustrated in FIG. 10 includes identification information acquiring unit 401, decider 402, communication-combined determiner 403, Loc information acquiring unit 404, broadcast receiver 405, communication receiver 406, synchronization determiner 407, and reproducer 408.

Since identification information acquiring unit 401 to communication receiver 406 are similar to identification information acquiring unit 301 to communication receiver 306 described with reference to FIG. 8, description thereof is omitted.

Synchronization determiner 407 has a function for executing a process in step S405 illustrated in FIG. 9.

Reproducer 408 decodes and reproduces broadcast contents or communication contents based on a reproducing method decided by determined results of communication-combined determiner 403 and synchronization determiner 407.

Third Modified Example

Another examples different from the above-described examples are described below.

Another Example 1

The transmission paths are not limited to the combination of broadcast and communication, and thus a combination of the same kind of transmission paths for broadcast and broadcast or communication and communication may be used.

Further, when information for each package such as the transmission path identifying descriptor is not indicated, the location information for each asset illustrated in FIG. 1A and FIG. 1B is interpreted so that the decision may be made whether each asset is transmitted through broadcast or communication or whether an asset to be transmitted through communication is present in a package.

(Location Information)

The location information may include URL information about an asset acquisition destination. When the acquisition destination is URL, a decision can be made whether the asset is transmitted through broadcast or communication based on whether the URL is specific URL defined in advance in broadcast service.

For example, when a broadcast asset is transmitted in the same stream as message information of MPT, the location information indicates ID of a packet for storing asset data therein ("packet_id" in case of an MMT packet) as the acquisition destination of the broadcast asset, and indicates URL as the acquisition destination of an asset to be transmitted through communication. Therefore, the decision may be made whether the asset is transmitted through communication according to whether the acquisition destination is URL in the location information.

Modified Example of Description of MPT

With reference to FIG. 1A and FIG. 1B, the case where the location information for each asset and the individual transmission path identifying descriptors are defined as the information for each asset is described, but the present disclosure is not limited to this. A field indicating an asset encoding system may be additionally provided. The encoding system is information essential at a time of decoding, and it is desirable that the encoding system is signaled in information such as MPT that can be acquired prior to decoding. For example, information such as "stream_type" in the MPEG-2 system can be used.

Further, in the encoding system that enables scalable encoding, information about whether the asset is in a basic layer or an extended layer may be indicated together with the encoding system.

Further, a plurality of assets having scalability is included in such a case where two videos having time scalability are present in one MMT package. At this time, information indicating correspondence between the asset of the extended layer and the asset of the basic layer may be indicated. For example, for the asset of the extended layer, the information may indicate an asset ID of the corresponding basic layer. Further, the asset of the extended layers and the asset of the basic layers may be grouped so that a group ID is allocated to the respective assets.

These pieces of information can be indicated in the broadcast program information even when TS is used in broadcast and DASH or RTP is used in communication. For example, a dependence relationship between a video stream to be transmitted through broadcast and a video stream to be transmitted through communication (the video stream on the communication side corresponds to the extended layer), or information indicating the encoding system of a video and an audio on the communication side can be described by the PMT descriptor. Further, the information may indicate whether the stream on the broadcast side and the stream on the communication side are synchronously reproduced.

(Information about Transmission Path)

Information indicating whether contents data is transmitted only through broadcast or through the combination of broadcast and communication may be stored in program information such as EPG.

For example, when viewing is selected or recording is reserved from EPG, and data to be transmitted through communication cannot be reproduced nor recorded like a case where a communication network is not connected or the receiving apparatus does not cope with the data acquisition through communication, message information indicating that state may be displayed.

Further, information indicating whether data to be transmitted through communication can be acquired prior to a program start time. Particularly in a download type system such as DASH, data on the communication side is downloaded prior to the start of the program so that the reproduction of the broadcast data and the communication data can be started at the program start time.

For example, when the communication data can be acquired prior to the program start time, the receiving apparatus may start the reception of the communication data before the program start time. At this time, the reception start time is decided so that data for predetermined buffering data amount or buffering time can be received at the program start time.

Further, for example, a similar operation may be performed also in program timer recording.

In broadcast, when a user can select a plurality of programs at any timing, receives communication data of a program next to currently-viewing channel, and the viewing program is changed, the reception of the communication data in advance does not provide benefits. Therefore, as to all programs which can be viewed at any viewing time after the viewing time and whose data are transmitted through the combination of broadcast and communication, the communication data may be buffered in advance. When not all program data cannot be received, programs may be selected and received within a receivable range.

Further, also information indicating whether the broadcast data and the communication data are synchronously reproduced is included in the program information such as EPG, and when these data are synchronously reproduced, the communication data may be buffered in advance. When these data are not synchronously reproduced, the communication data may be started to be received after the reception of the broadcast data is started.

Even when such information is not included in EPG, MPT in MMT or PMT at a time of using TS for broadcast is analyzed, and similar information is acquired so that a similar message can be displayed.

Further, such information may be stored in control information at a time of demodulating a signal, such as a TMCC signal in the broadcast system in Japan, to be transmitted through the transmission path.

As a result, a determination can be made at the demodulation time whether the reception through communication is necessary, and actuation on the communication side can be accelerated.

(Format)

A file format on the HTTP base is not limited to DASH, and thus HTTP Live Streaming (HLS) or Microsoft Smooth Streaming (MSS) may be used. Also in these systems, since contents management information corresponding to MPD is present, the relationship between the broadcast data and the communication data can be indicated by a system similar to DASH.

Further, also on the communication side, the TS stream may be used or a format in which a field showing a 4-byte time stamp is added to a head of the TS packet may be used. TS with a time stamp is used in a lot of standards such as BD (Blu-ray (registered trademark) Disc) or an IPTV forum.

Another Example 2

(Attribute Information and Location Information)

An attribute of entire contents and individual attributes of streams such as audios and videos may be stored separately in the attribute information and the location information.

For example, when DASH is used on the communication side, broadcast contents and communication contents are synchronously reproduced, or the attribute information of the entire contents indicating that the broadcast contents are on the basic layer of scalability and the communication contents are on the extended layer may be stored in the transmission path identifying descriptor. On the other hand, information for identifying a video and an audio to be synchronously reproduced, such as individual attributes for respective streams, may be stored in MPD.

When a video on broadcast is associated with an audio of a SAP (Second Audio Program) to be transmitted through communication as an attribute example for each stream, PID of the TS packet for storing the video may be associated with audio identification information for identifying, within the DASH data, a track, a segment, Adaptation Set, or Representation of the audio, such as an audio track ID. The identification information about broadcast media may include PID, ID of a transport stream including a TS packet of this PID and service ID.

Contents of MPD are occasionally updated, and updating information is managed by a distribution server of DASH contents. For this reason, particularly, there are obtained an advantage such that individual attributes of streams are described in MPD and thus information exchange between a broadcast contents transmitting apparatus and a communication contents transmitting server can be reduced, and an advantage such that an entire attribute is stored in information such as PMT acquired at the broadcast reception start time and thus a communication contents reception start process can be quickly activated.

Further, both the entire attribute and the individual attributes may be described by any one of a descriptor such as PMT in broadcast and MPD or both of them. For example, in broadcast, the information may be described by a descriptor of application control information such as AIT.

(Attribute Information)

Further, a method for synchronizing clock information of streams to be transmitted through different transmission paths of broadcast and communication may be included in the attribute information. In this case, the receiving apparatus may perform clock synchronization based on this information.

For example, information for identifying the following three methods may be described as the attribute information.

Method 1) Streams to synchronize with each other are based on a common clock, and thus synchronization between their clocks is not necessary.

Method 2) Like the descriptor in PMT, the synchronization is performed based on information for clock synchronization to be transmitted separately from the streams.

Method 3) Like a timeline extension of TS that is being standardized in MPEG (13818-1:2013/AMD6 (2nd WD)), the synchronization is performed with reference to independent streams including information for clock synchronization.

In the method 3, PID of the TS packet for storing the streams for clock synchronization may be included in the attribute information.

Fourth Modified Example

As a new service where broadcast and communication are combined, Hybridcast standards that are standardized in the IPTV forum and are already adopted in ARIB standards is present.

In the conventional Hybridcast specification that is standardized in the IPTV forum and is already adopted in the ARIB standards, cooperation between a broadcast service and a communication service is allowed to function based on application control information (AIT: Application Information Table).

However, in the conventional Hybridcast specification, an application of HTML5 is downloaded on the communication side, and the application is started according to an issue of an event message. For this reason, the conventional Hybridcast specification does not cope with communication contents reproduction control based on PTS (Presentation Time Stamp) or DTS (Decoding Time Stamp) in the audio and video frames on the broadcast side, and thus cannot cope with high-definition synchronous reproduction such that display times of broadcast contents and communication contents are allowed to synchronize with each other in frame unit.

This modified example describes a system where the conventional Hybridcast specification is extended and broadcast contents and communication contents are synchronously reproduced with high definition.

The following describes extension of the application control information that enables the high-definition synchronous reproduction, and then describes the transmitting method and the reproducing method in this modified example.

[Execution Mode]

In the application control information in this modified example, information indicating an execution mode when an application is executed is introduced. The execution mode includes a mode 1 and a mode 2, and examples of the execution modes are described below.

(Mode 1)

Mode 1 does not require high-definition synchronization with another contents.

Further, in mode 1, like the application of the conventional Hybridcast standards, start or state transition is carried out by control codes such as AUTOSTART, PRESENT, PREFETCH, or event messages. In mode 1, the synchronous reproduction with reference to PTS or DTS of another audio and video streams is not necessary.

An example of the application of the conventional Hybridcast standards is VOD (Video On Demand). In VOD, when the application is started, UI on which a reproduction start button is arranged is displayed, and when the user presses down the reproduction start button, contents are started to be downloaded or streamed so as to be reproduced.

(Mode 2)

Mode 2 requires high-definition synchronization with contents to be transmitted on a transmission path other than a broadcast wave.

In mode 2, for example, a broadcast video and an audio acquired through the application are reproduced with their PTSs being synchronized with each other. Further, for example, when video scalability is applied, data of a basic layer to be transmitted through broadcast and data of an extended layer to be acquired through the application are decoded to be displayed by using DTSs and PTSs that synchronize with each other. The streams such as the audio and the video to be synchronously reproduced are acquired with reference to attribute information of the above-described contents.

(Operation of Application in Mode 2)

In the application, a method for reproducing communication contents is decided based on the above execution mode. Since the operation in mode 1 is similar to a conventional operation, description thereof is omitted, and thus the operation of the application in mode 2 is described below.

The basic operation when the broadcast contents and the communication contents are synchronously reproduced is as illustrated in a flowchart of FIG. 9.

When the communication contents are decoded to be reproduced according to DTS and PTS converted into the synchronized clocks after the clock synchronization, a communication contents process can be executed independently from a broadcast contents reproducing process.

On the other hand, when space scalability is applied in a video and a basic layer and an extended layer are transmitted through broadcast and communication, respectively, the extended layer is decoded by using a decoded result of the basic layer. For this reason, the broadcast contents process and the communication contents decoding processes should be integrated to be controlled. Further, when the broadcast contents and the communication contents are buffered and started to be reproduced or a reception buffer of any one of the contents during reproduction overflows or underflows, the reproduction processes on both the transmission paths should be integrated to be controlled. For example, when data reception on the overflow side is stopped or underflow occurs, both the reproducing processes on the broadcast contents and communication contents are stopped for a predetermined time length or until data of a predetermined size can be received.

When at least any processes of reception, decoding and reproduction on both the transmission paths are integrated to be controlled, a control command is delivered between the communication application and the broadcast contents reproducing processor. For example, the operation is performed by the following control command.

1) In Relation To Decoding Process: For example, data of an access unit corresponding to specific DTS or PTS is requested, and the operation is performed by a control command to be acquired. Only at the reproduction start time, the access units where synchronization is taken on broadcast and communication are acquired, and thereafter, data of the next access unit in ascending order of DTSs or PTSs is requested, and a control command to be acquired may be used.

2) In Relation To Data Reception: The operation is performed by a control command for instructing stop and restart of data reception or transmitting a state of accumulation of data by an amount that satisfies a predetermined condition in a buffer for pre-buffering. In the stop and restart of data reception, later-stage processes such as decoding and reproduction may be stopped or restarted, or control commands for the later-stage specific processes may be additionally defined.

In the application operation in mode 2, countermeasures against overflow and underflow of the buffer for pre-buffering include a countermeasure for performing the reproduction when the data on both the transmission paths are prepared and a countermeasure for reproducing only prepared data and skipping the reproduction of unprepared data.

Therefore, in addition to the specification of the reproduction mode, information indicating the countermeasure against the overflow and the underflow of the buffer for pre-buffering may be enabled to be specified.

For example, since congestion does not occur on the broadcast transmission path and thus the underflow is not caused by congestion, broadcast contents are reproduced according to DTS and PTS of an access unit. When the underflow of the buffer of communication contents occurs due to congestion of the communication path, the reproduction of the access unit of the communication contents where data is not present in DTS is skipped.

When DASH is used as the communication contents and the underflow of the buffer occurs, not all subsequent segments are acquired so that some segments are skipped. As a result, the reproduction can be quickly started.

More specifically, the respective segments of DASH are SEG1, SEG2, SEG3, . . . in ascending order of DTSs, and DTSs of head access units of the segments are T1, T2, T3, . . . . In this case, when the underflow occurs during the reception of SEG1, the reception of SEG2 is skipped and SEG3 is received. As a result, data of the head access unit of SEG3 is likely to be capable of being received at time T3, and thus the decoding and reproduction of both the broadcast and communication contents can be started from time T3. When SEG2 is received, the underflow is likely to continue, and thus the quick restart of the reproduction is expected by skipping the reception segment.

Further, for example, when the underflow occurs on the communication side, the reproduction of the broadcast contents is stopped while the data buffering of the communication contents is completed and the data is enabled to be reproduced.

When the attribute information of the contents to be transmitted through broadcast PMT indicates that the communication contents are to be reproduced synchronously with broadcast contents, or location information can be identified as a specific file such as MPD of DASH based on an extension of the location information of the communication contents, the execution mode may be decided without explicitly describing the execution mode as control information.

Further, when contents to be transmitted through a plurality of transmission paths, the reception to the reproduction through broadcast and communication may be controlled by a single application.

[Application Control Information]

The following describes an example where when broadcast contents and communication contents are synchronously reproduced, information about data to be transmitted through communication is stored in application control information in the Hybridcast specification.

FIG. 6A and FIG. 6B illustrate an example where location information about communication data is stored in a transmission path identifying descriptor and in PMT. In this modified example, the transmission path identifying descriptor is stored in the application control information.

In the conventional Hybridcast specification, the transmission path identifying descriptor is not stored in the application control information, and since the location information should be acquired after the execution of the application, a delay occurs. On the contrary, when the transmission path identifying descriptor is stored in the application control information and the location information is stored (arranged) in the transmission path identifying descriptor, the acquisition of contents can be started more quickly.

The application control information is, for example, AIT: Application Information Table), and is information for controlling start, end, resource, and access of the application. For example, an application ID for specifying the application, a control code that can control a life cycle such as start and end of the application, and the location information about the application are described in the application control information. Further, as to the application control information, a section format and an XML format are defined, and the transmission system includes a transmitting method using the section format and a method for transmitting the application control information of the XML format through data carousel. When the application control information is transmitted, a data encoding system descriptor including "ait_identifier_info( )" is arranged in an ES loop of PMT.

FIG. 11A and FIG. 11B are diagrams illustrating one example of the data structure of the application control information in the broadcast communication cooperative service according to the fourth modified example of the first exemplary embodiment. Specifically, FIG. 11A and FIG. 11B illustrate an example where information about data to be transmitted through communication is stored in the application control information of the section format.

Also in this modified example, in order to indicate the attribute information described with reference to FIG. 1A and FIG. 11B, the transmission path identifying descriptor is stored in a descriptor of each application. For example, since the program information in TS such as PMT indicates only the location information about data to be transmitted through TS, when the contents data are transmitted by the combination with communication, the location information about the communication data is stored in the transmission path identifying descriptor. More specifically, flag information indicating the combination of broadcast and communication is used is allowed to be included in the attribute information, so that a selection is made according to a value of the flag information whether the location information about the communication data is included.

The location information is information indicating a data acquisition destination, and the location information corresponds to PID in the TS section and corresponds to URL or URI in communication. MPD (Media Presentation Description) of DASH or SDP (Session Description Protocol) in RTP can be stored as the location information.

A descriptor may be additionally defined so that the location information is stored. Further, entity data of location information such as MPD and SDP is not stored, and information indicating entity data acquisition destination may be indicated.

For example, URL for acquiring MPD may be indicated. However, since a delay is caused by additional acquisition of the entity data of the location information, it is desirable for reducing the delay until the start of the reception of the communication data that the entity data is stored directly. However, since MPD of DASH includes various information about the contents acquisition destination, the size of MPD is large. Therefore, MPD is not directly stored, and subset information including only information relating to URL of the contents acquisition destination and relating to DTS and PTS of a segment may be stored.

This modified example, as illustrated in FIG. 11A and FIG. 11B, describes the example where the transmission path identifying descriptor is stored in the loop of each application, but the present disclosure is not limited to this.

For example, when one transmission path identifying descriptor is shared by a plurality of applications, the transmission path identifying descriptor may be stored in a loop of at least one of the applications using the transmission path identifying descriptors. In this case, information for allowing the transmission path identifying descriptors to be referred to is indicated in residual application loops so that descriptors can be omitted. The information for enabling the transmission path identifying descriptor to be referred to is, for example, a loop number of the application where the transmission path identifying descriptor is stored or an application ID.

Further, the transmission path identifying descriptors are stored in loops (room number N) just below the application control information, respectively, and identifiers for enabling the transmission path identifying descriptors to be specified are given, respectively, so that the identifiers to be referred to in the applications may be referred to.

Further, the example where the entity of the location information is stored in the transmission path identifying descriptor is not limited to the above example.

For example, when the entity size of the location information is large, the transmission path identifying descriptor including the entity of the location information or the application information including the transmission path identifying descriptor may be described in a loop after the application information that does not include the entity of the location information (a loop N1). As a result, data other than the entity data of the location information can be acquired on ahead. Further, the receiving apparatus that does not have to acquire the entity data of the location information may complete the acquisition of the application control information without completely acquiring the entity data of the location information.

Further, information indicating the acquisition destination of the entity of location information may be indicated inside the application. At this time, instead of the acquisition destination of the entity of the location information, information that enables the application whose acquisition destination is indicated to be specified (for example, an application ID and URL of the application) may be indicated, or the acquisition destination of the entity of the location information does not have to be indicated.

Further, FIG. 12 is a diagram illustrating another example of the data structure of the application control information in the broadcast communication cooperative service according to the fourth modified example of the first exemplary embodiment. That is to say, in this modified example, as illustrated in FIG. 12, information indicating that an application information identifier includes a transmission identifying descriptor or attribute information may be stored in a descriptor such as "ait_identifier_info( )" to be stored in PMT. The receiver analyzes PMT, so as to be capable of understanding broadcast-communication-cooperative contents earlier, and thus a time until broadcast contents and communication contents are synchronously reproduced can be shortened.

Further, only the attribute information in the transmission path identifying descriptors may be transmitted through PMT.

Further, for example, the identifier such as the application type may indicate that the application is an HTML5 application that is operated in cooperation with broadcast.

This modified example describes the application control information of the section format, but the present disclosure is not limited to this. The transmission path identifying descriptor may be stored in the application control information of the XML format. In this case, the transmission path identifying descriptor may be expressed by the section format or the XML format.

Further, in this modified example, another section is defined without using the application control information, so that a similar function may be realized. In this case, information for specifying a section including the transmission path identifying descriptor (PID or a stream type) may be stored in PMT. It is desirable that this modified example can cope with updating of the contents of the location information such as MPD. For example, the updating of MPD may be indicated by a version number of the application control information. Alternatively, when a control code in the application control information is used and the control code indicates "MPD_CHANGE", MPD is updated. When MPD is acquired through communication, the application may be allowed to reacquire the control code as "MPD_REROAD".

Further, in this modified example, the attribute information and the location information may be transmitted in both program information such as PMT and the transmission path identifying descriptor. In this case, only the location information may be stored in the transmission path identifying descriptor.

Further, in this modified example, after the communication data is started to be acquired based on the location information acquired through broadcast, the updated contents of the location information may be acquired through communication. At this time, since the acquisition destination of the location information is required, the acquisition destination of the location information as well as the entity data of the location information may be stored in the transmission path identifying descriptor of broadcast. The receiving apparatus periodically accesses to the acquisition destination of the location information so as to be capable of acquiring the updated contents through communication. When the message exchange system is present between the DASH contents distributing server and the receiving apparatus, a message indicating the updating of the location information is issued from the server to the receiving apparatus, and when the receiving apparatus receives the message, it may reacquire the location information.

Further, in this modified example, information indicating a correlation between reference clocks of the broadcast data and the communication data described with reference to FIG. 6A and FIG. 6B may be included in the transmission path identifying descriptor or the application control information.

Further, in this modified example, the transmission path identifying descriptor may represent information about a protocol of a transport layer such as whether the communication data is transmitted according to UDP (User Datagram Protocol) or TCP (Transmission Control Protocol). As a result, in the receiving apparatus, a determination can be made whether a port to be used in each protocol is opened or whether the receiving apparatus copes with the protocol to be used. Further, a discrimination may be made whether the multiplexing format in the communication data is, for example, DASH or RTP by presenting identification information. As a result, for example, when a multiplexing format is DASH, a determination can be made that the location information is described in the MPD format.

[Transmitting Method]

In this exemplary embodiment, the transmitting side transmits contents (data or an asset) using a broadcast wave and a communication path, but the application control information is transmitted prior to the transmission of the contents.

[Receiving Method]

In this exemplary embodiment, the receiving side starts to receive (acquire) contents after acquisition of the application control information. The receiving method in this modified example is described below with reference to the drawings. That is to say, an operational example of the receiving apparatus in the combination of broadcast and communication using the Hybridcast specification is described. This modified example describes an example where broadcast transmission is performed by using TS, and communication transmission is performed by using DASH or RTP (Real-time Transport Protocol).

Figure 13A:
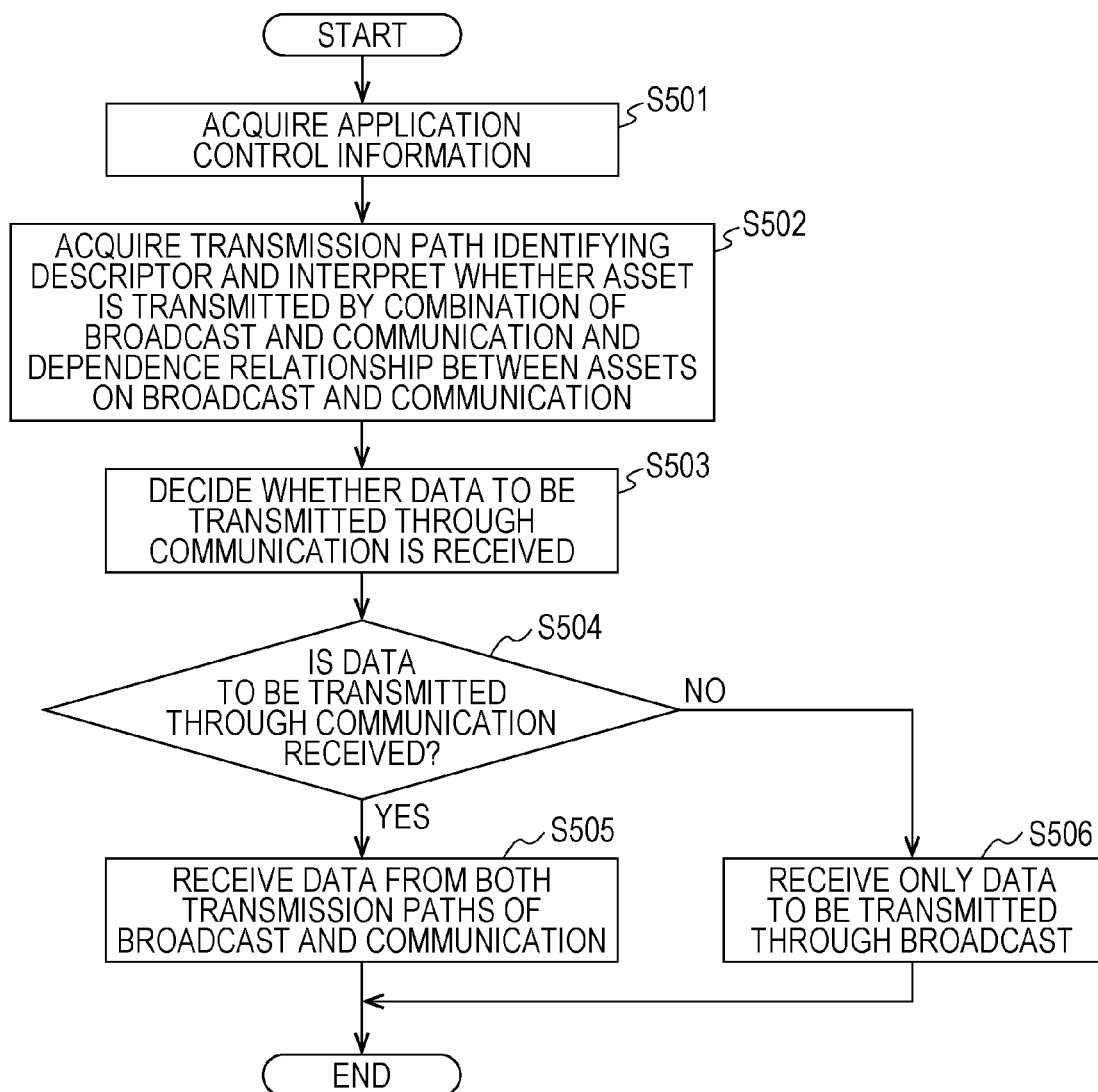
FIG. 13A is a flowchart illustrating one example of the operation on the receiving side in the broadcast communication cooperative service according to the fourth modified example of the first exemplary embodiment.

FIG. 13A is a flowchart illustrating one example of the operation on the receiving side in the broadcast communication cooperative service according to the fourth modified example of the first exemplary embodiment. FIG. 13A illustrates an operational example when the attribute information and the location information are stored in the broadcast application control information. The asset described in FIG. 13A is data about TS on the broadcast side and DASH and RTP on the communication side. The attribute information is equivalent to the contents described with reference to FIG. 7A.

The application control information is acquired in step S501. A next operation in step S502 is performed, but since operations after step S502 (step S502, step S504 to step S506) are the same as the operations described with reference to FIG. 7A (step S201, step S203 to step S205), description thereof is omitted. Only different operation in step S503 is described below.

A decision is made in step S503 whether data to be transmitted through communication is received based on the information about the transmission path identifying descriptor, and whether the application to be transmitted through communication is received based on the location information about the application described in the application control information.

Figure 13B:
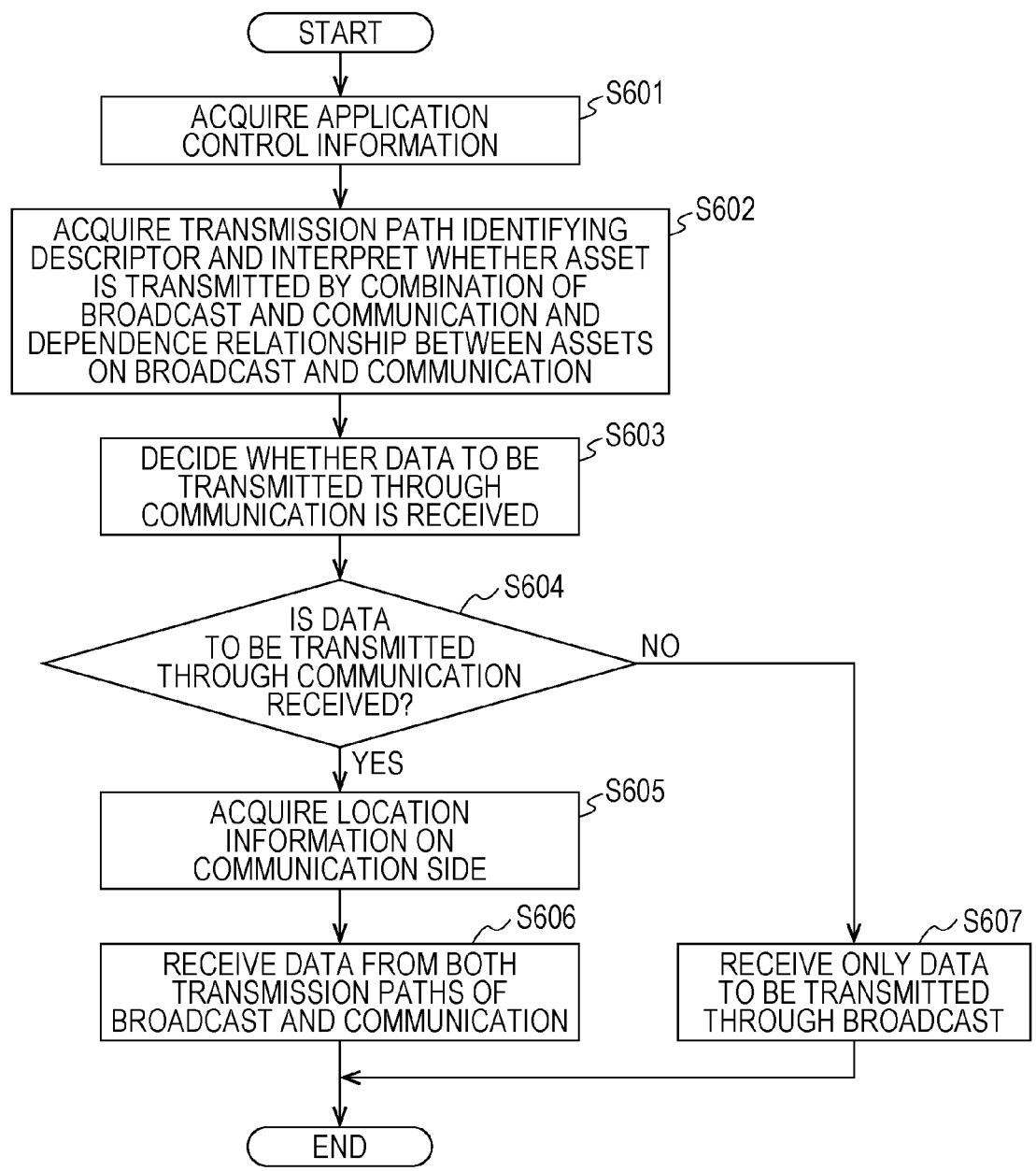
FIG. 13B is a flowchart illustrating a comparative example of the operation on the receiving side in the broadcast communication cooperative service according to the fourth modified example of the first exemplary embodiment.

FIG. 13B is a flowchart illustrating a comparative example of the operation on the receiving side in the broadcast communication cooperative service according to the fourth modified example of the first exemplary embodiment. FIG. 13B illustrates an operational example when access information for acquiring the attribute information and the location information is stored in the broadcast program information and entity of the location information is not stored.

After the application control information is acquired in step S601, a next operation in step S602 is performed, but since operations after step S602 (step S602, step S604 to step S607) are the same as the operations described with reference to FIG. 7B (step S301, step S303 to step S305), description thereof is omitted.

A decision is made in step S603 whether data to be transmitted through communication is received based on the information about the transmission path identifying descriptor, and whether the application to be transmitted through communication is received based on the location information about the application described in the application control information.

When an operation flow illustrated in FIG. 13A is compared with the operation flow illustrated in FIG. 13B, the operation flow in FIG. 13 does not have a step of acquiring the location information on the communication side. As a result, in the operation on the receiving side illustrated in FIG. 13A, the start of communication data reception can be quickly acquired.

Further, in the operation flow illustrated in FIG. 13A, processes corresponding to step S405, step S406, and step S407 described with reference to FIG. 9 may be executed. That is to say, a decision is made whether the broadcast contents and the communication contents are synchronously reproduced, and when they are synchronously reproduced, synchronization information is acquired from the transmission path identifying descriptor, and reference clocks of broadcast and communication are allowed to synchronize so that both the contents may be synchronously reproduced.

Further, at a time point when the determination is made in step S503 and step S603 that data to be transmitted through communication is received, the start of the application may be prepared.

For example, a browser of HTML5 is actuated at the time point when the determination is made that the data transmitted through communication is received, so that a time until the execution of the application can be shortened.

Further, for example, when a determination is made in step S603 that the location information on the communication side is received through communication, the application is immediately started so that the location information on the communication side may be acquired. Further, after the location information on the communication side is acquired, buffering of communication contents may be started. The buffering start timing may be instructed by the control command of application control information, or time information about pre-buffering is described in the location information on the communication side and is analyzed by the receiving apparatus so as to be pre-buffered.

As the application for acquiring the location information on the communication side or the application for acquiring the communication contents, the application specified by the application control information may be acquired through broadcast or communication so as to be executed. Further, the application for acquiring the location information on the communication side and the application for acquiring the communication contents may be realized as resident applications. For example, execution of the HTML5 application and the resident application, and data acquisition may be controlled by the control command of the application control information, or the execution of the HTML5 application and the resident application, and the data acquisition may be controlled by a determination in the receiving apparatus.

Further, when information relating to an ability of the receiving apparatus necessary for reproducing the contents is described in the location information, the receiving apparatus acquires the reproducing ability of the receiving apparatus according to an API command. In this case, authority to acquire the reproducing ability of the receiving apparatus is given to the application for analyzing the location information. For example, after the location information on the communication side is acquired in step S605, when a determination is made that the receiving apparatus cannot reproduce the contents, the sequence goes to step S607, the receiving apparatus may receive only data to be transmitted through broadcast.

Further, a control may be realized by the API command so that the location information on the communication side and information about the communication contents acquired by various methods are stored in a memory of the receiving apparatus, are acquired from the memory, and are exchanged between applications. The applications can acquire some or all pieces of the location information on the communication side by executing the API command. For example, the location information acquired by the resident application is set in the memory of the receiving apparatus by the API command, and can be gotten from the memory by the API command in the HTML5 application.

Effects of the First Exemplary Embodiment

According to this exemplary embodiment, identification information indicating whether contents including audios and videos are transmitted through the combination of broadcast and communication, and information indicating a dependence relationship between data to be transmitted through both transmission paths at the time of the combination of broadcast and communication may be generated as contents management information so as to be transmitted. For example, information indicating the dependence relationship between data may indicate whether data to be transmitted through both the transmission paths are synchronously reproduced. Further, the information indicating the dependence relationship between data may indicate that pieces of clock information of data to be transmitted through both the transmission paths are identical to each other.

As a result, since the transmission paths through which the contents including audios and videos are transmitted, and the dependence relationship between the data to be transmitted through different transmission paths can be acquired at the time of starting the reception of the contents, a delay time relating to a decision of an asset to be received and the start of the acquisition of the communication contents can be reduced.

Further, according to this exemplary embodiment, the location information about the data to be transmitted through communication may be included in the contents management information. The location information about the data to be transmitted may be, for example, MPD in MPEG-DASH. Further, not entity data of the location information such as MPD but information indicating the acquisition destination of the location information may be stored in the contents management information.

As a result, since the transmission paths through which the contents including audios and videos are transmitted, and the dependence relationship between the data to be transmitted through different transmission paths can be acquired at the time of starting the reception of the contents, a delay time relating to a decision of an asset to be received and the start of the acquisition of the communication contents can be reduced.

Further, according to this exemplary embodiment, in the receiving apparatus, the contents management information is analyzed so that a transmission path through which contents are received and data to be received through the transmission paths may be decided. Further, when data to be transmitted through both the transmission paths are synchronously reproduced, auxiliary information necessary for clock synchronization between the data may be acquired so that DTSs and PTSs of the data are synchronized, and the data may be decoded to be reproduced.

As a result, the receiving apparatus that receives only broadcast data can reproduce the broadcast data according to the operation similar to the conventional broadcast reception, and simultaneously can cope with reproduction of communication data.

Further, a system for synchronizing broadcast and communication data with each other so as to reproduce these data can be provided to the receiving apparatus.

Further, this exemplary embodiment can realize the contents transmitting method, the receiving method, the transmitting apparatus, and the receiving apparatus for enabling a quick access to contents through communication when the contents are reproduced by using the combination of broadcast and communication on the receiving side.

For example, in accordance with one aspect of the present disclosure, a transmitting method for transmitting contents using a broadcast wave and a communication path includes an information transmitting step of, when contents are transmitted by using the broadcast wave and the communication path, allowing application control information to include information that is for synchronizing the contents through the broadcast wave and the contents through the communication path when the contents are received by a receiving side and that relates to the contents to be transmitted through the communication path, and transmitting the application control information using at least the broadcast wave in the broadcast wave and the communication path.

As a result, when contents are transmitted by using the broadcast wave and the communication path, the application control information is allowed to include information that is for synchronizing the contents using the broadcast wave and the contents using the communication path when the receiving side receives the contents and that relates to the contents to be transmitted through the communication path, and the application control information is transmitted. For this reason, when the receiving side receives the application control information, the receiving side is enabled to quickly access to the contents using communication according to this information, and is enabled to synchronize both the contents with each other.

Further, for example, in the information transmitting step, prior to transmission of the contents, the application control information is transmitted, and the application control information may further include location information indicating an acquisition destination of the contents or information indicating an acquisition destination of the location information.

Further, the receiving method from one aspect of this exemplary embodiment includes a receiving step of receiving contents transmitted by using a broadcast wave and a communication path, and a reproducing step of, when application control information that is for synchronizing the contents using the broadcast wave and the contents using the communication path and includes information about the contents to be transmitted through the communication path is received from at least the broadcast wave in the broadcast wave and the communication path, executing the synchronizing process so as to reproduce the contents.

As a result, the application control information to be transmitted on the transmission path such as the broadcast wave to be the entry point is acquired, and when the application control information includes the information that is for synchronizing the contents through the broadcast wave and the contents through the communication path and that relates to the contents to be transmitted through the communication path, the synchronizing process can be performed.

Further, for example, in the receiving step, prior to the reception of the contents, the application control information is received, and when the application control information includes the location information indicating an acquisition destination of the contents, the contents are acquired based on the location information so that the contents may be received.

Further, for example, in the receiving step, prior to the reception of the contents, the application control information is received, and when the application control information includes information indicating an acquisition destination of location information indicating an acquisition destination of the contents, the location information is acquired based on the information indicating the acquisition destination of the location information, and the contents are acquired from the acquired location information so that the contents may be received.

Further, the transmitting apparatus according to one aspect of the this exemplary embodiment for transmitting contents using a broadcast wave and a communication path includes an information transmitter that, when the contents are transmitted by using the broadcast wave and the communication path, allows application control information to include information which is for synchronizing the contents using the broadcast wave and the contents using the communication path when a receiving side receives the contents and which relates to the contents to be transmitted through the communication path and that transmits the application control information using at least the broadcast wave in the broadcast wave and the communication path.

Further, the receiving apparatus according to one aspect of this exemplary embodiment includes a receiver that receives contents transmitted by using a broadcast wave and a communication path, and a reproducer that, when application control information including information which is for synchronizing the contents through the broadcast wave and the contents through the communication path and which relates to the contents to be transmitted through the communication path is received, executes the synchronizing process so as to reproduce the contents.

Second Exemplary Embodiment

First Example

For example, in a third example of the first modified example, a method for storing the location information in the case of the transmission using TS for broadcast and DASH or RTP for communication is described with reference to FIG. 6A to FIG. 7B, but the storage method is not limited to this.

This exemplary embodiment describes one specific example of the method for storing the location information as the first example.

FIG. 14 is a diagram illustrating one example of the data structure of the service information in the broadcast communication cooperative service according to a first example of a second exemplary embodiment. FIG. 14 illustrates an example of a descriptor (location information descriptor) indicating the location information such as MPD. The location information may be included in the above-described transmission path identifying descriptor. For this reason, the location information descriptor may be considered to correspond to the transmission path identifying descriptor.

In this exemplary embodiment, the descriptor is stored in section data different form PMT or PMT.

The information indicated by this descriptor includes a transmission format indicating a type of entity data to be referred to in the location information, the location information, and a field indicating information about synchronization between PCR on broadcast and data on communication.

The location information in this exemplary embodiment indicates a reference destination of the entity data of the location information. Here the example where the entity data of the location information is MPD is indicated, MPD is indicated as the transmission format, and information about synchronization between PCR and NTP is indicated as the synchronization information.

Since MPD is the location information to be used in DASH, DASH is indicated as the transmission format, and the reference destination of MPD may be indicated as a location. When the transmission format can be identified by an extension in URL of the location information, a field of the transmission format does not have to be included. Further, MPD is transmitted using two ways including broadcast and a communication network, and when MPD is transmitted on broadcast, a private section of MPEG-2 TS is used. Therefore, as the location information of MPD, identification information about a TS packet for storing MPD in a transport stream such as PID of the private section is indicated, and when MPD is transmitted via the communication network, information such as URL can be indicated.

[Receiving Method]

As the receiving method according to this exemplary embodiment, one example of the operation of the receiving apparatus when the descriptor indicating the location information is analyzed and broadcast and communication contents are synchronously reproduced is described below.

FIG. 15 is a flowchart illustrating one example of the operation on the receiving side in the broadcast communication cooperative service according to the first example of the second exemplary embodiment.

The location information descriptor to be stored in PMT is analyzed in step S801.

A determination is made in step S802 whether MPD is present in broadcast. When MPD is present in broadcast (MPD is transmitted through broadcast) (Yes in S802), the sequence goes to step S803, and entity data of MPD is acquired from the TS packet having PID indicated by the location information. On the other hand, when MPD is not present in broadcast (No in S802), MPD is acquired from a communication server based on URL indicated by the location information.

Data to be acquired from DASH contents is decided based on the analyzed result of MPD in step S805, and the data is acquired by download (or progressive download).

When synchronization information included in the location information descriptor or timeline extension of MPEG-2 TS is used in step S806, the broadcast contents and the communication contents are synchronously reproduced based on synchronization information acquired from the TS packet storing timeline extension information.

When the timeline extension is used, the synchronization information does not have to be included in the location information descriptor. Further, when the DASH contents and the broadcast contents do not have to be synchronously reproduced, the synchronization information does not have to be transmitted. In this case, a determination may be made whether the synchronous reproduction of both the contents is necessary based on whether the synchronization information in the location information descriptor or the synchronization information in timeline extension data is present. Whether the synchronous reproduction is necessary may be additionally indicated.

Further, when the synchronous reproduction is not necessary, start and end of the reproduction of the DASH contents can be decided in step S806 based on a user's instruction or a control command in a Hybridcast application. In this case, a decision is made at a former stage of S801 whether data is acquired through communication.

An example where MPD is acquired and the DASH contents are reproduced is described with reference to FIG. 15, but much the same is true on a case where data of another system such as RTP or TS is acquired to be reproduced.

In the timeline extension, an access unit for storing the timeline extension information is defined, and both a descriptor indicating the location information and a descriptor indicating the synchronization information can be stored in the access unit.

Therefore, the location information descriptor is not transmitted, and both the location information and the synchronization information may be indicated by the timeline extension. In the current timeline extension, PID cannot be indicated as the location information, and a field indicating a scheme type of the location information may be extended, so that PID can be signaled.

Further, an upper limit of the section size of PMT is limited to 1021 bytes but the section occasionally exceeds the upper limit depending on URL in the location information. The PMT section can be divided to be stored, but it is desirable that particularly PMT is stored in one section.

Therefore, when the section size of PMT exceeds 1021 bytes, the location information descriptor may be transmitted by a section different from PMT. When the location information indicates PID, the size of PMT can be made to fall within the upper limit and the location information can be included in PMT. For this reason, the section where the location information is stored may be switched based on whether the location information is PID or URL.

Second Example

The first example describes that the location information can be indicated in a TEMI (Timeline and Extend Media Information stream) access unit in the timeline extension.

Specifically, URL of the communication contents can be described by using "temi_location_descriptor". Since URLs of a plurality of contents can be described in "Temi_location_descriptor", and restrictions of data size of this descriptor are not present unlike the section size of PMT, a flexible operation can be performed for description of URLs.

On the other hand, when PID of a TS packet in a transport stream is indicated as the location information, the data size of the location information is small, and location information is acquired at a time of analyzing PMT with reference to the location information descriptor, so that the delay time relating to acquisition can be reduced. For this reason, it is desirable that both the location information descriptor and "temi_location_descriptor" in a TEMI access unit can be used as storage places of the location information.

One example of a syntax (data structure) of the location information descriptor according to this exemplary embodiment is described below.

FIG. 16A is a diagram illustrating one example of syntax of location information descriptor according to a second example of the second exemplary embodiment. FIG. 16A illustrates a syntax example of the location information descriptor for storing the location information in any of the location information descriptor and the TEMI access unit.

In the description of this example, information about synchronization with PCR is described by using "temi_timeline_descriptor" of the TEMI access unit, but is not included in the location information descriptor. Semantics for respective fields shown in FIG. 16A are described.

A format "data_format" is similar to the transmission format illustrated in FIG. 14. That is to say, metainformation of reproduction control to be used in the service, such as MPD in DASH, reproduction control metafile in VOD (Video On Demand) specifications of the IPTV forum, or TTS (Time-stamp TS) defined in the IPTV forum, is indicated. Not the metainformation such as TTS, an MP4 file, or encoded data of AV, but identification information of streams itself may be indicated. MPT in MMT, a PA message, an MMT packet, or an asset may be indicated.

For example, time scalability can be realized in a moving image encoding system such as H.265. A basic layer of 60 fps is transmitted through broadcast and encoded data of an extended layer for improving a frame rate from 60 fps to 120 fps is transmitted through communication. In this case, only URL of an encoded stream of the extended layer may be indicated as the location information of communication contents. Information such as resolution and the encoding system in the encoded stream can be acquired in broadcast data whose basic layer is to be transmitted.

A field "location_type" is for identifying the location information as PID of TS in broadcast, or URL in communication. When location_type=0, PID of TS in broadcast is indicated. The location information descriptor can be used also in, for example, MMT (MPEG Media Transport) of MPEG other than TS. In formats other than TS, "location_type" does not have to be used. For example, another information such as "packet_id" of the MMT packet in MMT for identifying a location may be used.

"PID" indicates PID of the TS packet. When broadcast is formed by a plurality of transport streams, an identification number of the transport stream may be also stored.

A field "url_location" indicates whether URL of the communication contents is stored in the location information descriptor or the TEMI access unit. In this example, when url_location=0, URL is stored in the location information descriptor. When "url_location" indicates 1, URL of the communication contents is stored in "temi_location_descriptor" in the TEMI access unit.

A field "url_length" indicates a byte length of "url_path". A field "url_path" indicates data about URL.

FIG. 16B is a diagram illustrating one example of syntax of location information descriptor according to the second example of the second exemplary embodiment. FIG. 16B illustrates an example different from the syntax of the location information descriptor illustrated in FIG. 16A. A difference from the syntax illustrated in FIG. 16A is that when the location information is stored in the TEMI access unit, a filed "data_format" is not present.

A field "Temi_location_descriptor" can indicate a service type of TEMI in a field "service_type". This service type corresponds to "data_format". Therefore, the information "data_format" is indicated in the field "service_type".

In the syntax illustrated in FIG. 16A, the fields "data_format" and "service_type" of "temi_location_descriptor" occasionally coexist. In this case, both of them indicate the same information.

A field "service_type" is not signaled in "temi_location_descriptor", and only URL of the communication contents can be indicated. Therefore, when the syntax in FIG. 16A is used, "data_format" of the location information descriptor is referred to as the transmission format, and "service_type" of "temi_location_descriptor" does not have to be signaled.

FIG. 16C is a diagram illustrating one example of syntax of location information descriptor according to the second example of the second exemplary embodiment. FIG. 16C illustrates an example different from the syntax of the location information descriptor illustrated in FIGS. 16A and 16B.

A difference from FIG. 16A is that a condition of "url_location" is branched. That is to say, when url_location=0 and the location information is in the location information descriptor, PID of TS on broadcast and communication URL are stored according to "location_type". On the other hand, when url_location=1, "location_type" is not described in the location information descriptor, and in "temi_location_descriptor" in the TEMI access unit, "location_type" is indicated in the field "service_type" and PID of TS on broadcast or communication URL is stored in "temi_location_descriptor".

FIG. 16D is a diagram illustrating one example of syntax of the location information descriptor according to the second example of the second exemplary embodiment. FIG. 16D illustrates an example different from the syntax of the location information descriptor illustrated in FIG. 16A to FIG. 16C.

A difference from FIG. 16A is that "url_location" is integrated with "location_type". When location_type=0, it indicates PID of broadcast, and when location_type=1, it indicates communication URL. Further, when location_type=2, it indicates that PID of TS on broadcast or communication URL is stored in "temi_location_descriptor" in the TEMI access unit.

The data and the data structure of the syntax of the location information descriptor are not limited to the above examples. For example, different data may be combined in such a manner that the location type and the format type are integrated to be indicated. Further, for example, when the transmission format can be identified by extension in URL of the location information, the field of the transmission format does not have to be included. Further, for example, when the location information descriptor is not present, the location information is indicated by "temi_location_descriptor", and a field "url_location" may be omitted.

Third Example

An example different from the location information described in the second example is described below.
(Another Example of Location Information)

For example, when two or more kinds of timelines are present in one program, a plurality of TEMI streams is occasionally included for each kind of time lines.

In this case, plural pieces of location information may be stored in the location information descriptor. When the plural pieces of location information are stored, loops whose number is the same as a number of the TEMI streams are generated in the location information descriptor, and the location information is stored for the respective TEMI streams. Further, as a method that indicates correspondence relationships between the plurality of location information loops and the plurality of TEMI streams in the location information descriptor, for example, the location information loops and ES loops (PMT second loops) indicating the TEMI streams that are matched with each other as to order may establish the correspondence relationships. Further, when two or more kinds of timelines are present, the location information is not stored in the location information descriptor but may be stored in "temi_location_descriptor" of the TEMI access unit, or the location information descriptor may be stored in the ES loops (the PMT second loops).
(Updating of Location Information)

It is desirable that this example can cope with updating of the contents of the location information such as metainformation.

For example, when a reload flag is added to the location information descriptor in PMT and the contents of the location information are updated, reload=1. The receiving apparatus regards the contents of the location information as being updated when reload=1, and may reacquire PID and URL stored in the location information. When the location information such as PID and URL is not updated, and only data is updated, only the data may be reacquired.

Further, the location information or information indicating whether contents of data such as MPD in which an acquisition destination is indicated by the location information may be independently indicated.

Further, the location information descriptor in PMT to be periodically transmitted may be sequentially checked. However, since the sequential checking process is heavy, section data for storage of the location information descriptor, or an event section for notification of updating may be additionally generated so as to be periodically transmitted.

In the receiving apparatus, a version number of the section is checked so that a determination can be made whether the location information is updated. Further, when the location information is transmitted through a broadcast section, a version number of the section of the location information is updated so that updating of metainformation is indicated.

Further, after acquisition of communication data is started based on the location information acquired through broadcast, updated contents of the location information may be acquired through communication.
[Receiving Method]

As the receiving method according to this example, one example of the operation of the receiving apparatus when the descriptor indicating the location information is analyzed and broadcast and communication contents are synchronously reproduced is described below.

Figure 17:
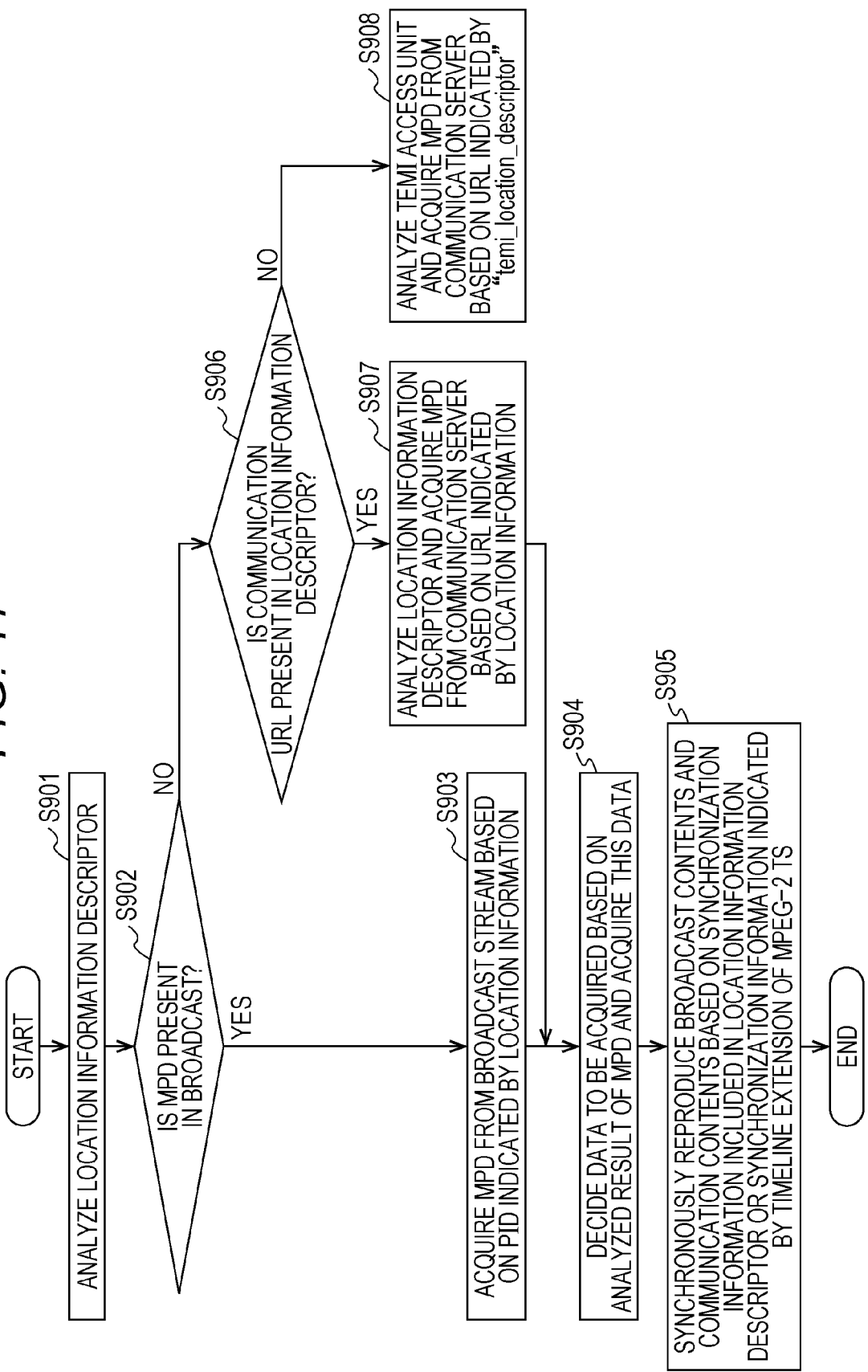
FIG. 17 is a flowchart illustrating one example of the operation on the receiving side in the broadcast communication cooperative service according to a third example of the second exemplary embodiment.

FIG. 17 is a flowchart illustrating one example of the operation on the receiving side in the broadcast communication cooperative service according to the third example of the second exemplary embodiment.

Step S804 in FIG. 15 is changed into step S906, step S907, and step S908 in FIG. 17. Since the other operations (step S901 to step S905) are similar to the operations (step S801 to step S803, step S805, and step S806) in FIG. 15, description thereof is omitted.

A determination is made in step S906 whether an acquisition destination URL of MPD is stored in the location information descriptor or the TEMI access unit. When the URL is in the location information descriptor (Yes in S906), the sequence goes to step S907, and the location information descriptor is analyzed, so that MPD is acquired from the communication server based on URL indicated in the location information. On the other hand, when the determination is made in step S906 that URL is stored in the TEMI access unit (No in S906), MPD is acquired from the communication server based on URL indicated in "temi_location_descriptor" in the TEMI access unit.

FIG. 17 illustrates an example where MPD is indicated as format information, but broadcast contents and communication contents can be synchronously reproduced by the similar flow operation even in another metainformation.

Figure 18:
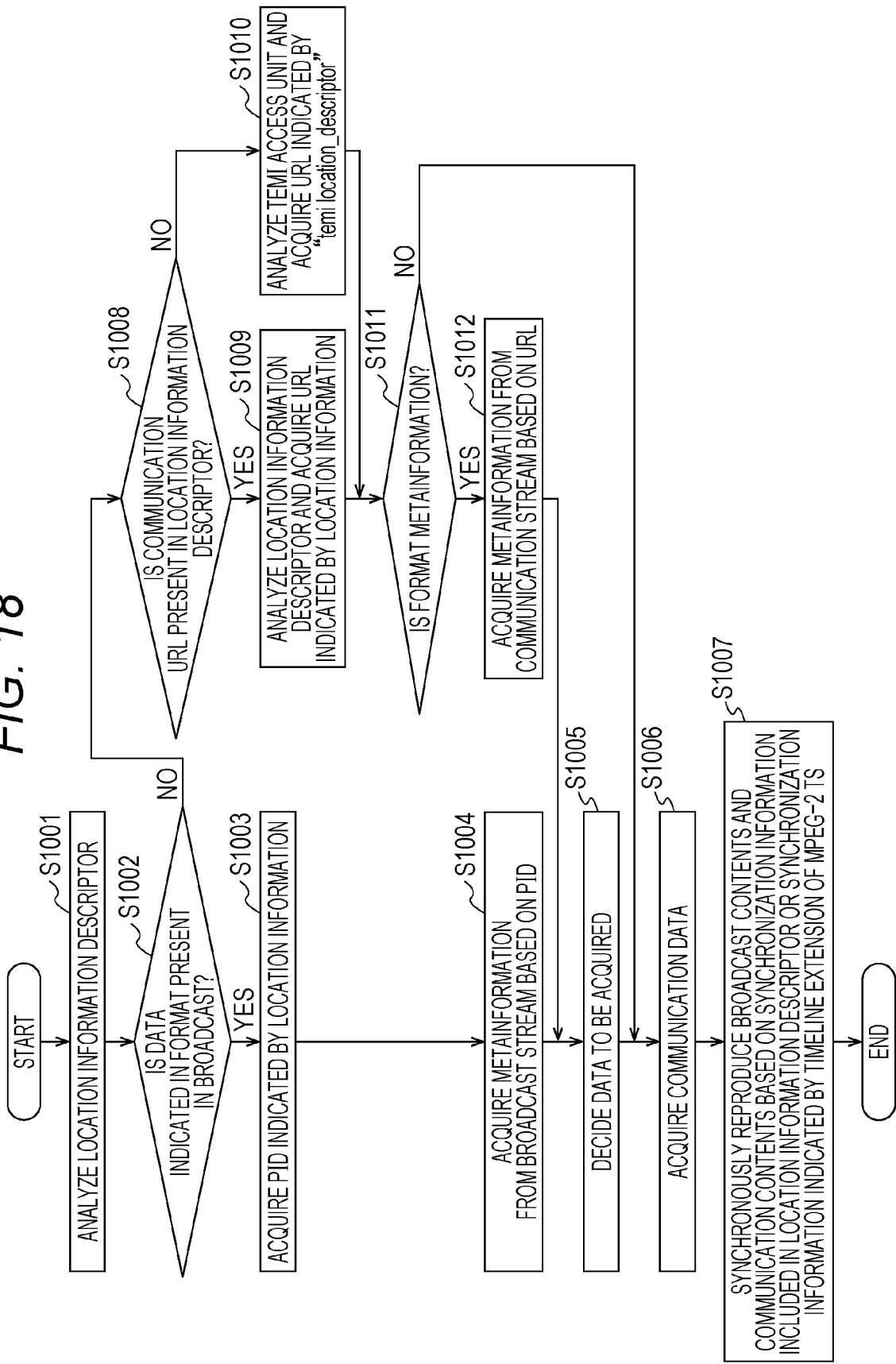
FIG. 18 is a flowchart illustrating another example of the operation on the receiving side in the broadcast communication cooperative service according to the third example of the second exemplary embodiment.

FIG. 18 is a flowchart illustrating another example of the operation on the receiving side in the broadcast communication cooperative service according to the third example of the second exemplary embodiment. FIG. 18 illustrates the operation when format information is metainformation other than MPD. More specifically, when not the metainformation such as MPD but a format of entity data such as a stream is indicated in the format information, URL of entity data of the stream is acquired instead of URL of metainformation in step S907 and step S908 illustrated in FIG. 11.

At first, the receiving apparatus analyzes the location information descriptor in step S1001.

A determination is made whether data indicated in the format is present in broadcast (step S1002). When the data is present in the broadcast (Yes in S1002), the sequence goes to step S1003, and PID indicated in the location information is acquired. Since it is not assumed that the entity data such as the stream is included in broadcast, when data is present in broadcast, the format is confirmed to be metadata.

A metainformation file is acquired from a broadcast stream based on PID (step S1004), and communication data to be acquired is decided (step S1005).

On the other hand, when the data is present on communication in step S1002 (No in S1002), the sequence goes to step S1008, and a determination is made whether URL of the communication data is present in the location information descriptor or in "temi_location_descriptor" of the TEMI access unit. URL is acquired in step S1009 or step S1010 according to respective cases.

A determination is made in step S1011 whether the format is metainformation. When the format is metainformation (Yes in S1011), the sequence goes to step S1012, the metainformation is acquired from the communication stream based on URL, and the sequence goes to step S1005 so that communication data to be acquired is decided.

After the communication data to be acquired in step Sp1005 is decided or when the determination is made in step S1011 that the format is not metainformation, the sequence goes to step S1006 so that communication data is acquired.

Finally, in step S1007, the broadcast contents and the communication contents are synchronously reproduced based on synchronization information included in the location information descriptor or synchronization information indicated by a timeline extension of MPEG-2 TS.

Fourth Example

The above description refers to that the determination is made whether the broadcast contents and the communication contents are synchronously reproduced, and when the synchronous reproduction is performed, the broadcast contents and the communication contents are acquired and synchronously reproduced, but the present disclosure is not limited to this.

In this example, information indicating whether reference clock information about an audio and a video to be transmitted through broadcast is identical to reference clock information about an audio and a video to be transmitted through communication is included in the service information (a transmission identification descriptor), and the operation based on this information is described.

[Information Indicating Whether Reference Clocks (Timelines) of Broadcast and Communication are Synchronized with Each Other]

When contents using broadcast and communication are transmitted by using MMT, DASH, RTP, or Hybridcast, information indicating whether the reference clock information about an audio and a video to be transmitted through broadcast is identical to the reference clock information about an audio and a video to be transmitted through communication may be stored in the transmission identification descriptor, program information, EPG, or EIT.

For example, when the contents to be transmitted through broadcast and communication are operated based on a common reference clock (for example, a time stamp is given), information indicating that the operation is performed based on the common reference clock is stored. Further, when the contents to be transmitted through broadcast and communication are operated based on different reference clocks, information indicating that the operation is performed based on the different reference clocks is stored.

Further, only when broadcast and communication use different reference clocks, information necessary for the synchronization of the reference clocks (for example, timeline extension information) may be indicated. Further, a storage place of information necessary for the synchronization of the reference clocks, a type of the information necessary for the synchronization of the reference clocks, and a method for synchronizing the reference clocks may be indicated.

In the synchronization between the reference clocks, the reference clock used in broadcast can be matched with the reference clock used in communication and vice versa.

For example, when PCR (Program Clock Reference) is used in broadcast and NTP (Network Time Protocol) is used in communication, DTS and PTS in a video and an audio on an NTP basis are converted into DTS and PTS on a PCR basis, and a type and a method of the synchronization between the reference clocks may be indicated so that the reference clocks in broadcast and communication can be synchronized with each other. Further, the type and the method of the synchronization between the reference clocks may be indicated in such a manner that DTS and PTS of broadcast and communication are converted so as to be synchronized with a specific clock to be used in the receiving apparatus.

Identification information indicating a type and a method of information necessary for the synchronization between the reference clocks is analyzed, and the reference clocks may be synchronized by a method based on the identification information.

Further, when a plurality of streams with various reference clocks is present, information indicating that the plurality of streams with various reference clocks is present may be stored in a descriptor. Descriptors or one descriptor may be indicated for respective various reference clocks. Information indicating a correspondence relationship between the reference clocks and programs using the reference clocks may be stored.

As information indicating whether reference clocks are identical to each other, the above-described descriptor may be indicated, or another descriptor, a table or a section may be used. Further, as the above information, information indicating whether information necessary for the clock synchronization (for example, timeline extension information) is present may be indicated. When the information necessary for the clock synchronization is present, the clock information may be different. In another manner, a fact that the clock information is different may be indicated by using attribute information of the communication contents indicated in the transmission identification descriptor (for example, information relating to a format and a type, or extension described in location information or URL).

In a case of Hybridcast, such information may be stored in an AIT controlled section or an application.

When the receiving apparatus determines that different pieces of clock information is used, the reference clock information of broadcast is allowed to synchronize with the reference clock information of communication. Further, when the determination is made that common clock information is used, the synchronization between clocks is determined as being unnecessary.

The receiving apparatus may determine whether the reference clock of the broadcast contents actually synchronizes with the reference clock of the communication contents considering all of a result of identifying whether reference clock information of data stored in a transmission identifying descriptor is identical to each other, as well as user's selection and user's setting through a user interface, intentions of a contents provider, a service provider and a broadcasting station, specifications of the receiving apparatus, and an intension of a receiver manufacturer.

Further, when determining that the reference clocks synchronize with each other, the receiving apparatus may actually start the synchronization at timing after the determination or may start the synchronization without waiting for the determination, namely, at timing when information about the synchronization is acquired. In another manner, the synchronization may be started according to the time when the communication contents are started to be acquired (for example, a constant time before the start of the acquisition of the contents or the same time as the acquisition start time).

Further, when reproduction of a reference clock to be a reference source (for example, PCR of broadcast) is not completed (a clock cannot be used due to smoothing of an influence of jitter), the clock synchronization with the reference source may be started at a time when the clock reproduction of the reference clock information as the reference source is completed.

When the information indicating whether the reference clocks of broadcast and communication synchronize with each other is indicated by EPG, similarly to buffering of communication contents, a determination whether the synchronization of the reference clocks is necessary before start of broadcast may be started or the synchronization of the reference clocks may be started. In such a manner, the reference clocks synchronize with each other earlier, so that the service can be provided to viewers more quickly.

The information indicating whether the reference clocks are identical to each other is not limited to the combination of broadcast and communication, and this information can be applied to a case where transmission is performed on the same route, and a case where different pieces of reference clock information is used in data to be acquired from a plurality of routes such as broadcast, communication, and accumulation format.

Some or all of the functions and processes described in this example may be implemented by hardware or by software. Some of the functions and processes can be implemented as hardware or as software.

For example, when they may be implemented by software, the functions and the processes described in this example are instructed, a state of the receiving function may be notified by PUSH, the function to be acquired may be packaged by PULL, or an API function may be provided.

The API function can be executed through an application. When the functions and the processes are implemented as applications, they may be implemented by resident applications or an application such as HTML5 may be used. API may be implemented as exchange of data between the applications or notification of a state.

A feature of the API function relating to the information indicating whether the reference clocks synchronize with each other includes the followings 1) to 9).

1) The information indicating whether the reference clock information of the broadcast contents and the reference clock information of the communication contents are identical to each other is acquired.
2) The information indicating whether the synchronization between the reference clocks is necessary is acquired.
3) Type and synchronizing methods of the respective pieces of reference clock information are acquired.
4) The information necessary for the clock synchronization (the timeline information) is acquired.
5) An acquisition destination of the information necessary for the clock synchronization is acquired.
6) The clock information about the reference source is used as a parameter, so that synchronized clock information of the reference destination is returned. For example, when the reference clocks are not synchronized, a value indicating the unsynchronized state is returned.
7) Start of the synchronization between the reference clocks is instructed.
8) A state indicating whether the reference clocks synchronize with each other is acquired.
9) The synchronized state of the reference clocks is notified.

[Receiving Method]

The following describes one example of an operation such that when the attribute information and the location information are stored in the broadcast program information, the receiving apparatus determines whether broadcast contents and communication contents are synchronously reproduced as the receiving method of this example with reference to the drawings.

Figure 19:
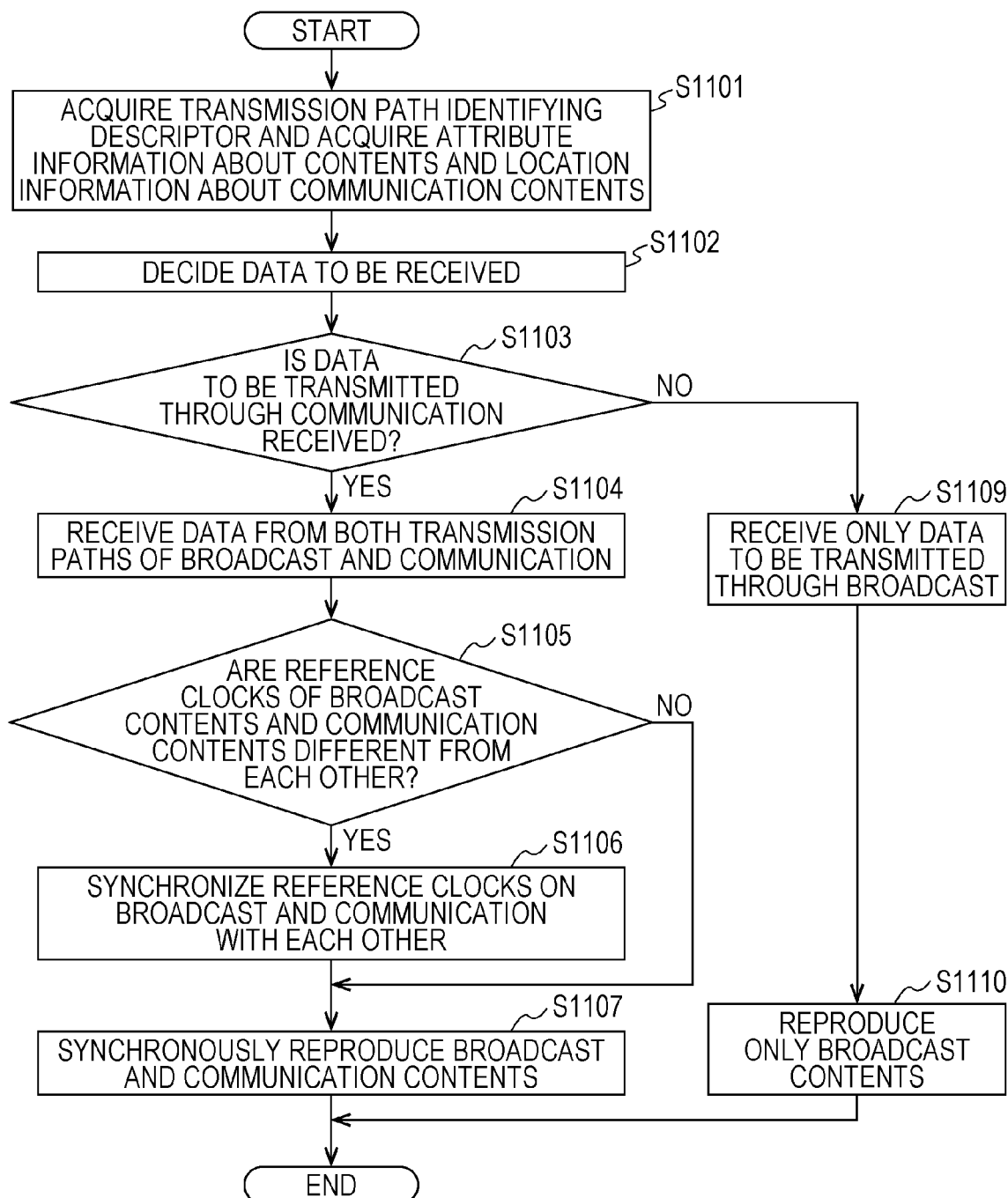
FIG. 19 is a flowchart illustrating one example of the operation on the receiving side in the broadcast communication cooperative service according to a fourth example of the second exemplary embodiment.

FIG. 19 is a flowchart illustrating one example of the operation on the receiving side in the broadcast communication cooperative service according to the fourth example of the second exemplary embodiment. The operation of the flowchart illustrated in FIG. 19 can be applied also to the broadcast communication cooperative service using any combination of multiplexing systems such as MMT, DASH, and RTP. Further, this operation can be applied also to Hybridcast.

In FIG. 19, it is assumed that the broadcast contents and the communication contents synchronize with each other, and the determination whether the broadcast contents and the communication contents synchronize with each other is omitted.

Further, step S1101 and step S1102 are similar to step S401 and step S402 in FIG. 9; therefore, description thereof is omitted.

A determination is then made in step S1103 whether the receiving apparatus acquires the communication contents. When the decision is made that the communication contents are acquired (Yes in S1103), the sequence goes to step S1104, and the data is received from both the broadcast and communication transmission paths, and a determination is made in next step S1105 whether the reference clocks of the broadcast contents and the communication contents are the same as or different from each other.

When the determination is made in step S1105 that the reference clocks are different from each other (Yes in S1105), the sequence goes to step S1106, and the reference clock of broadcast contents is made to synchronize with the reference clock of the communication contents so that both the contents are synchronously reproduced in step S1107.

On the other hand, when the determination is made in step S1105 that the reference clocks are the same as each other (No in S1105), the reference clocks do not synchronize with each other so that the contents are synchronously reproduced by using a common clock.

The process for determining whether the synchronization between the reference clocks is necessary may be executed after step S1105. For example, a determination is made whether the ability of the receiving apparatus copes with the synchronization between the clocks, whether the clock synchronization is performed as the specification of the receiver, or whether the user allows the clocks synchronize with each using the type and the method of the clock synchronization. A result, a determination is made whether comprehensively the reference clocks on broadcast and communication synchronize with each other according to the determined result in step S1105, and the sequence may go to step S1106 or step S1107.

Further, the synchronization between the reference clocks in S1106 may be performed prior to S1104. This is because when reception data of contents is pre-buffered and started to be reproduced, after a check is made that data whose PTS is T1 in the broadcast contents and data whose PTS is T1 in the communication contents (their PTSs already synchronize with each other) are already received, these data are decoded and are started to be reproduced in some cases. Further, this is because when the determination is made whether the data to be synchronously reproduced are matched, it is necessary that both the reference clocks already synchronize with each other.

Further, when the clocks cannot synchronize in step S1106 because the clock synchronization information cannot be acquired or because of the specifications of the receiver, the broadcast and communication cooperative service cannot be provided to the user in some cases. In this case, a determination whether the synchronization is essential or a determination that the data may be reproduced is made without synchronization, so that a determination may be made whether data to be transmitted through communication in step S1103 is received.

At step S1103, a determination may be made whether the data to be transmitted through communication is actually received considering all of information capable of being identified by the transmission identifying descriptor as well as user's selection and setting, intentions of a contents provider, a service provider and a broadcasting station, specifications of the receiving apparatus, and an intension of a manufacturer.

[Receiving Apparatus]

Figure 20:
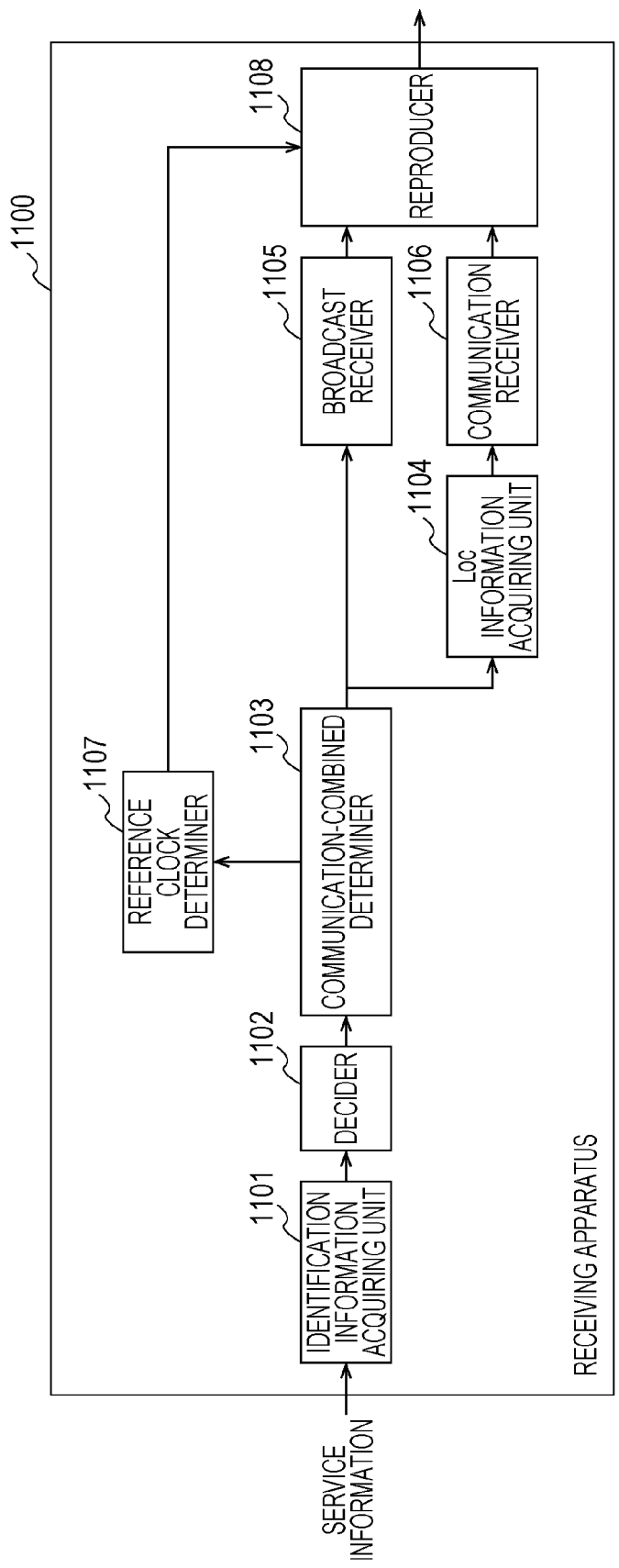
FIG. 20 is a block diagram illustrating one example of the constitution of the receiving apparatus according to the fourth example of the second exemplary embodiment.

One example of the constitution of the receiving apparatus realizing the operation illustrated in FIG. 19 is described below. FIG. 20 is a block diagram illustrating one example of the constitution of the receiving apparatus according to the fourth example of the second exemplary embodiment.

Receiving apparatus 1100 illustrated in FIG. 20 includes identification information acquiring unit 1101, decider 1102, communication-combined determiner 1103, Loc information acquiring unit 1104, broadcast receiver 1105, communication receiver 1106, reference clock determiner 1107, and reproducer 1108.

Since identification information acquiring unit 1101 to communication receiver 1106 are similar to identification information acquiring unit 301 to communication receiver 306 described with reference to FIG. 8, description thereof is omitted.

Reference clock determiner 1107 has a function for executing a process in step S1105 illustrated in FIG. 19. Further, reference clock determiner 1107 determines whether reference clocks are different from each other, and further may execute a process for determining whether the above synchronization between the reference clocks is necessary.

Reproducer 1108 synchronizes the reference clocks based on a method decided by a determined result in reference clock determiner 1107 when the reference clocks are different from each other, and decodes to reproduce broadcast contents or communication contents.

The function, the constitution of the receiving apparatus, and the receiving method described in this modified example are examples and thus the present disclosure is not limited to them. Any function, constitution, and method may be used as long as they can realize similar function and effect.

Effects of the Second Exemplary Embodiment

According to this exemplary embodiment, identification information indicating whether contents including audios and videos are transmitted through the combination of broadcast and communication, and information indicating a dependence relationship between data to be transmitted through both transmission paths at the time of the combination of broadcast and communication may be generated as contents management information so as to be transmitted. For example, information indicating the dependence relationship between data may indicate whether data to be transmitted through both the transmission paths are synchronously reproduced. Further, the information indicating the dependence relationship between data may indicate whether the clock information of data to be transmitted through both the transmission paths are identical to each other.

As a result, since the transmission paths through which the contents including audios and videos are transmitted, and the dependence relationship between the data to be transmitted through different transmission paths can be acquired at the time of starting the reception of the contents, a delay time relating to a decision of an asset to be received and the start of the acquisition of the communication contents can be reduced.

Further, according to this exemplary embodiment, the location information about the data to be transmitted through communication may be included in the contents management information. The location information about the data to be transmitted may be, for example, MPD in MPEG-DASH. Further, not entity data of the location information such as MPD but information indicating the acquisition destination of the location information may be stored in the contents management information.

As a result, since the transmission paths through which the contents including audios and videos are transmitted, and the dependence relationship between the data to be transmitted through different transmission paths can be acquired at the time of starting the reception of the contents, the delay time relating to the decision of an asset to be received and the start of the acquisition of the communication contents can be reduced.

Further, according to this exemplary embodiment, in the receiving apparatus, the contents management information is analyzed so that a transmission path through which contents are received and data to be received through the transmission paths may be decided. For example, when the clock information of data to be transmitted through both the transmission paths are different from each other, auxiliary information necessary for clock synchronization between the data may be acquired so that DTSs and PTSs of the data are allowed to synchronize, and the data may be decoded to be reproduced. Further, when data to be transmitted through both the transmission paths are synchronously reproduced, auxiliary information necessary for clock synchronization between the data may be acquired so that DTSs and PTSs of the data may be allowed to synchronize, and the data may be decoded to be reproduced.

As a result, the receiving apparatus that receives only broadcast data can reproduce the broadcast data according to the operation similar to the conventional broadcast reception, and simultaneously can cope with reproduction of communication data.

Further, a system for synchronizing broadcast and communication data with each other so as to reproduce these data can be provided to the receiving apparatus.

Further, even when clocks of data to be transmitted through a plurality of transmission paths do not synchronize with each other, auxiliary information necessary for the clock synchronization is acquired so that the clocks synchronize with each other and data can be synchronously reproduced.

This exemplary embodiment can realize the contents transmitting method, the receiving method, the transmitting apparatus, and the receiving apparatus for enabling a quick access to contents through communication when the contents are reproduced by using the combination of broadcast and communication on the receiving side.

For example, in accordance with one aspect of the present disclosure, a transmitting method for transmitting contents using a broadcast wave and a communication path includes an information transmitting step of, when the contents are transmitted by using the broadcast wave and the communication path, allowing application control information to include information that is for synchronizing the contents through the broadcast wave and the contents through the communication path when the contents are received by a receiving side and that relates to the contents to be transmitted through the communication path, and transmitting the application control information using at least the broadcast wave in the broadcast wave and the communication path.

As a result, when contents are transmitted by using the broadcast wave and the communication path, the application control information is allowed to include information that is for synchronizing the contents using the broadcast wave and the contents using the communication path when the receiving side receives the contents and that relates to the contents to be transmitted through the communication path, and the application control information is transmitted. For this reason, when the receiving side receives the application control information, the receiving side is enabled to quickly access to the contents using communication, and is enabled to synchronize both the contents with each other.

Further, for example, in the information transmitting step, prior to transmission of the contents, the application control information is transmitted, and the application control information may further include location information indicating an acquisition destination of the contents or information indicating an acquisition destination of the location information.

Further, for example, in the information transmitting step, the application control information may be allowed to include differential information between a reference clock of the contents through the broadcast wave and a reference clock of the contents through the communication path so as to be transmitted.

Further, for example, in the information transmitting step, the application control information is transmitted, and the reference clock of the contents through the communication path is made to synchronize with the reference clock of the contents through the broadcast wave based on the differential information so that the receiving side may take the synchronization.

Further, the receiving method from one aspect of this exemplary embodiment includes a receiving step of receiving contents transmitted by using a broadcast wave and a communication path, and a reproducing step of, when application control information that is for synchronizing the contents using the broadcast wave and the contents using the communication path and includes information about the contents to be transmitted through the communication path is received from at least the broadcast wave in the broadcast wave and the communication path, executing the synchronizing process so as to reproduce the contents.

As a result, the application control information to be transmitted on the transmission path such as the broadcast wave to be the entry point is acquired, and when the application control information includes the information that is for synchronizing the contents through the broadcast wave and the contents through the communication path and that relates to the contents to be transmitted through the communication path, the synchronizing process can be performed.

For example, in the receiving step, prior to the reception of the contents, the application control information is received, and when the application control information further includes location information indicating an acquisition destination of the contents, the contents are acquired based on the location information so that the contents may be received.

Further, for example, in the receiving step, prior to the reception of the contents, the application control information is received, and when the application control information includes information indicating an acquisition destination of location information indicating an acquisition destination of the contents, the location information is acquired based on the information indicating the acquisition destination of the location information, and the contents are acquired from the acquired location information so that the contents may be received.

Further, for example, in the reproducing step, when the application control information that includes differential information between a reference clock of the contents through the broadcast wave and a reference clock of the contents through communication path is received in the receiving step, and the reference clock of the contents through the broadcast wave is different from the reference clock of the contents through the communication path, the reference clock of the contents through the communication path is made to synchronize with the reference clock of the contents through the broadcast wave based on the differential information, so that a process for synchronizing the contents with each other is executed and the contents may be reproduced.

The above describes the transmitting method and the receiving method according to one or a plurality of modes of the present disclosure based on the exemplary embodiments, but the present disclosure is not limited to the exemplary embodiments. Various modifications that are made by a person skilled in the art in this exemplary embodiment and modes structured by combinations of components in different exemplary embodiments may be included in the range of one or the plurality of modes of the present disclosure without departing from the purpose of the present disclosure.

For example, in the above exemplary embodiments, the respective components may be formed by dedicated hardware or may be realized by executing software programs suitable for the components, respectively. The components may be realized in a manner that a program executing unit such as a CPU or a processor reads software programs recorded in a recording medium such as a hard disc or a semiconductor memory and executes the software programs.

Further, for example, the attribute information may include the information that indicates whether the clock information of an audio and a video transmitted through broadcast is identical to the clock information of an audio and a video transmitted through communication.

Further, in the synchronization between the reference clocks in S406, the attribute information includes the information that indicates whether the reference clock information of a plurality of components are identical to each other. When the receiving side can acquire the information indicating that the difference in the reference clock information from the attribute information, the reference clocks on broadcast and communication may be synchronized with each other by using the above method.

Further, when the contents are transmitted through the broadcast wave and the communication path, the transmission path identifying descriptor is transmitted, and when the contents are transmitted by using only the broadcast wave, the transmission path identifying descriptor is not transmitted. This constitution enables the receiver to determine whether the contents are transmitted by the combination with the communication path or by using only the broadcast wave based on whether the transmission path identifying descriptor is included.

Further, the method for synchronizing clock information of streams to be transmitted through different transmission paths such as broadcast and communication may be included in the attribute information, but the present disclosure is not limited to this. The attribute information may include a method for synchronizing the information indicating whether the clock information about the streams to be transmitted through different transmission paths such as broadcast and communication with each other or a method for the synchronization.

The present disclosure is useful as the contents transmitting method and receiving method for enabling contents to be transmitted by using a broadcast wave and a communication path.

What is claimed is:

1. A receiving method comprising:
  receiving a first control data and a first media data, the first control data including first time information indicating a presentation start time of the first media data specified in a first timeline, the first control data including first location information, the first location information being used to obtain a second control data, the second control data including a second location information, the second location information being used to obtain a second media data;
  receiving the second control data and the second media data, the second control data including second time information indicating a presentation start time of the second media data specified in a second timeline;
  decoding and representing the first media data based on the first control data; and
  decoding and representing the second media data based on the first control data, wherein
  an absence of an offset value in the first control data indicates the first timeline and the second timeline are identical, the offset value indicating a difference between the first timeline and the second timeline.

2. A receiving apparatus comprising:
  a processor; and a memory, wherein
  the processor, in operation, performs:
  receiving a first control data and a first media data, the first control data including first time information indicating a presentation start time of the first media data specified in a first timeline, the first control data including first location information, the first location information being used to obtain a second control data, the second control data including a second location information, the second location information being used to obtain a second media data;
  receiving the second control data and the second media data, the second control data including second time information indicating a presentation start time of the second media data specified in a second timeline;
  decoding and representing the first media data based on the first control data; and
  decoding and representing the second media data based on the first control data, wherein
  an absence of an offset value in the first control data indicates the first timeline and the second timeline are identical, the offset value indicating a difference between the first timeline and the second timeline.

\* \* \* \* \*